(12) United States Patent
Ul Hamid

(10) Patent No.: US 9,982,141 B2
(45) Date of Patent: May 29, 2018

(54) CORROSION RESISTANT COATING COMPOSITION OF NI AND A PHOSPHATE CORROSION INHIBITOR AND AN ELECTRODEPOSITION METHOD FOR THE MANUFACTURE THEREOF

(71) Applicant: KING FAHD UNIVERSITY OF PETROLEUM AND MINERALS, Dhahran (SA)

(72) Inventor: Anwar Ul Hamid, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days. days.

(21) Appl. No.: 14/989,430

(22) Filed: Jan. 6, 2016

(65) Prior Publication Data

US 2017/0190921 A1 Jul. 6, 2017

(51) Int. Cl.
| | |
|---|---|
| C23C 28/00 | (2006.01) |
| C25D 5/18 | (2006.01) |
| C25D 3/12 | (2006.01) |
| C09D 5/10 | (2006.01) |
| C09D 5/08 | (2006.01) |
| C25D 5/36 | (2006.01) |
| C09D 7/12 | (2006.01) |
| C25D 5/06 | (2006.01) |
| C23C 18/36 | (2006.01) |

(52) U.S. Cl.
CPC ............ C09D 5/10 (2013.01); C09D 7/1216 (2013.01); C23C 28/322 (2013.01); C23C 28/34 (2013.01); C25D 3/12 (2013.01); C25D 5/18 (2013.01); C25D 5/36 (2013.01); C09D 5/084 (2013.01); C23C 18/36 (2013.01); C25D 5/06 (2013.01)

(58) Field of Classification Search
CPC . C09D 5/10; C09D 5/084; C25D 5/18; C25D 3/12; C23C 28/322; C23C 28/34
See application file for complete search history.

(56) References Cited

U.S. PATENT DOCUMENTS

| | | | | |
|---|---|---|---|---|
| 4,499,136 A | * | 2/1985 | Nakamura | .......... B29C 61/0616 138/DIG. 1 |
| 2009/0226673 A1 | * | 9/2009 | Friedersdorf | ............ B05D 5/00 428/167 |

FOREIGN PATENT DOCUMENTS

| | | |
|---|---|---|
| CN | 203787101 U | 8/2014 |
| KR | 1356066 B1 | 1/2014 |

OTHER PUBLICATIONS

Ul-Hamid, Anwar, Quddus, Abdul, Saricimen, Huseyin, & Dafalla, Hatim. (2015). Corrosion Behavior of Coarse- and Fine-Grain Ni Coatings Incorporating NaH2PO4.H2O Inhibitor Treated Substrates. Materials Research, 18(1), 20-26. <https://dx.doi.org/10.1590/1516-1439.253114>.*

Whang, S.H. ((2011). "Nanostructured Metals and Alloys: Processing, Microstructure, Mechanical Properties and Applications". Woodhead Publishing; 1 edition, pp. 128-145).*

* cited by examiner

Primary Examiner — Cheng Huang
(74) Attorney, Agent, or Firm — Oblon, McClelland, Maier & Neustadt, L.L.P.

(57) ABSTRACT

A corrosion resistant coating composition for a metal substrate is disclosed. The metal substrate, such as carbon steel, is coated with a first layer comprising a phosphate corrosion inhibitor, such as sodium phosphate monobasic ($NaH_2PO_4$) and a second layer comprising nickel nanoparticles. In addition, an electrodeposition method for the production of the coating composition is disclosed that uses either pulse or direct current electrodeposition to form the coating composition of desired anticorrosive properties. In addition, a coated metal substrate and method for inhibiting corrosion of a metal substrate that apply the corrosion resistant coating composition in any of its embodiments are disclosed.

17 Claims, 13 Drawing Sheets

CORROSION RESISTANT COATING COMPOSITION OF NI AND A PHOSPHATE CORROSION INHIBITOR AND AN ELECTRODEPOSITION METHOD FOR THE MANUFACTURE THEREOF

BACKGROUND OF THE INVENTION

Technical Field

The present disclosure relates to a corrosion resistant coating composition for a metal substrate, and an electrodeposition method for the production thereof. More specifically, the present invention relates to a metal substrate coated with a layer containing a phosphate corrosion inhibitor and a layer containing nickel nanoparticles of desirable microstructure and a method employing a pulse electrodeposition solution technique to form a coated metal substrate having improved corrosion resistance.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Nickel (Ni) is commonly employed to enhance surface properties of various materials using electroless nickel plating or electrolytic methods [D. Pletcher, F. C. Walsh, *Industrial Electrochemistry*, 2nd edition, Chapman and Hall, London, 1990; and J. K. Dennis, T. E. *Such, Nickel and Chromium Plating*, Butterworth, London, 1986; A. Ul-Hamid, H. Dafalla, A. Quddus, H. Saricimen and L. M. Al-Hadhrami (2011), Electrochemical deposition of Ni on an Al—Cu alloy, *J. of Mat. Eng. and Perf.* doi: 10.1007/s11665-010-9816-9. —each incorporated herein by reference in its entirety]. Nickel is a preferred choice for coatings due to its strength and resistance to surface degradation as well as due to its visual appeal. The electrolytic method of deposition is selected when it is necessary to have some control over the crystallite size, surface morphology and orientation of Ni, which in turn can significantly affect the surface related properties of the coatings. Conventionally, Ni coatings have been prepared using direct current (dc) electrochemical methods [J. R. Tuck, A. M. Korsunsky, R. I. Davidson, S. J. Bull, D. M. Elliott, Surf. Coat. Technol. 127 (2000) 1; and K. C. Chan, W. K. Chan, N. S. Qu, J. Mater. Process. Technol. 89-90 (1999) 447; and H. Zhao, L. Liu, J. Zhu, Y. Tang, W. Hu, Materials Letters 61 (2007) 1605-1608; and A. Ul-Hamid, Abdul Quddus, F. K. Al-Yousef, A. I. Mohammed, H. Saricimen and L. M. Al-Hadhrami (December 2010) Microstructure and Surface Mechanical Properties of Electrodeposited Ni Coating on Al 2014 alloy, *Surface and Coatings Technology*, Vol. 205 (7) pp. 2023-2030. —each incorporated herein by reference in its entirety]. More recently, the use of pulse electrodeposition has become popular since it results in Ni coatings with refined grain structure [A. M. El-Sherik, U. Erb, J. Mater. Sci. 30 (1995) 5743; and A. M. El-Sherik, U. Erb, J. Page, Surface and Coatings Technology 88 (1996) 70. —each incorporated herein by reference in its entirety] with attractive corrosion [R. Rofagha, R. Langer, A. M. El-Sherik, U. Erb, G. Palumbo, K. T. Aust, Scripta Metallurgica et Materialia, 25/12, 1991, 2867; and R. Mishra, R. Balasubramaniam, Corrosion Science 46 (2004) 3019; and C. Yang, Z. Yang, M. An, J. Zhang, Z. Tu, C. Li, Plat. Surf. Finish. 88 (5) (2001) 116. —each incorporated herein by reference in its entirety] and tribological properties [Y. Xuetao, W. Yu, S. Dongbai, Y. Hongying, Surface & Coatings Technology 202 (2008) 1895; and R. Mishra, B. Basu, R. Balasubramaniam, Materials Science and Engineering A 373 (2004) 370; and Y. F. Shen, W. Y. Xue, Y. D. Wang, Z. Y. Liu, L. Zuo, Surface & Coatings Technology 202 (2008) 5140; and D. H. Jeong, F. Gonzalez, G. Palumbo, K. T. Aust and U. Erb, Scripta mater. 44 (2001) 493; and Li Chen, L. Wang, Z. Zeng, T. Xu, Surface & Coatings Technology 201 (2006) 599; and A. Ul-Hamid, H. Dafalla, A. Quddus, H. Saricimen, L. M. Al-Hadhrami (June 2011) Microstructure and Surface Mechanical Properties of Pulse Electrodeposited Nickel, *Applied Surface Science*, doi:10.1016/j.apsusc.2011.04.120. —each incorporated herein by reference in its entirety].

Pulse plating is undertaken when current is applied in repetitive (i.e. pulse on—pulse off) square wave fashion rather than continuously as in dc plating. During pulse electrodeposition, peak current density, pulse on-time, and pulse off-time are accurately controlled. Advantages of pulse electrodeposition include its cost effectiveness and the high current density, power, and range of pulse waveforms available for plating [R. J. C. Choo, J. M. Toguri, A. M. El-Sherik, U. Erb, J. Appl. Electrochem. 25 (1995) 384. —incorporated herein by reference in its entirety]. Pulse electrodeposition results in fine nanostructured coating which show improvement in properties such as hardness, wear, abrasion, coefficients of friction, etc. compared to those produced by conventional dc plating.

Studies of the corrosion behavior of nanostructured coatings are of considerable interest due to their potential use as protective coatings in a wide range of applications. The fine grain structure of nanocoatings results in a high volume fraction of intergranular defects due to the increased density of grain boundaries and triple junctions. There is a concern that this could have an adverse effect on the localized corrosion behavior of nanocoatings. However, previous studies have shown that Ni base nanocoatings are resistant to corrosion. Some studies report an improvement in corrosion resistance while others show behavior comparable to polycrystalline Ni. It has also been reported that nanocrystalline Ni exhibits active-passive-transpassive polarization characteristics similar to that of coarse grained polycrystalline Ni.

In view of the forgoing, one object of the present disclosure is to provide a corrosion resistant coating composition for a metal substrate with an active inhibitor layer underneath nickel that can provide added protection from corrosion. A further aim of the present disclosure is to provide a method for forming the corrosion resistant coating composition comprising electrodepositing Ni (using both direct current and pulse electrodeposition techniques) to adhere a structurally appropriate Ni layer effectively to an inhibitor coated metal substrate. A further aim of the present disclosure is to provide a coated metal substrate as well as a method for inhibiting the corrosion of a metal substrate that includes applying the coating composition described herein.

BRIEF SUMMARY OF THE INVENTION

According to a first aspect, the present disclosure relates to a corrosion resistant coating composition for a metal substrate comprising i) a first coating layer comprising a phosphate corrosion inhibitor and ii) a second coating layer comprising nickel (Ni) nanoparticles, wherein the first coating layer is disposed between the metal substrate and the second coating layer.

In one embodiment, the phosphate corrosion inhibitor is sodium phosphate monobasic ($NaH_2PO_4$).

In one embodiment, the metal substrate comprises carbon steel.

In one embodiment, the nickel nanoparticles comprise fine equiaxed grains existing in the form of colonies with an average grain size of less than 100 nm.

In one embodiment, the second coating layer has an average thickness in the range of 1-150 µm.

In one embodiment, the first coating layer covers greater than 75% of the surface of the metal substrate and the second coating layer covers greater than 75% of the surface of the first coating layer.

In one embodiment, the second coating layer comprising Ni nanoparticles has an instrumented nanohardness in the range of 2000-4000 MPa.

In one embodiment, the corrosion resistant coating composition imparts a corrosion rate in the range of 0.2-5.0 mils penetration per year (mpy) to the metal substrate.

In one embodiment, the corrosion resistant coating composition imparts a zero current potential (ZCP) in the range of −250 mV to −600 mV to the metal substrate.

According to a second aspect, the present disclosure relates to a coated metal substrate comprising i) a metal substrate, ii) a first coating layer comprising a phosphate corrosion inhibitor, and iii) a second coating layer comprising nickel (Ni) nanoparticles, wherein the first coating layer is disposed between the metal substrate and the second coating layer.

According to a third aspect, the present disclosure relates to a method of forming the corrosion resistant coating composition for a metal substrate comprising i) applying a phosphate corrosion inhibitor to a metal substrate to form an inhibitor coated metal substrate and ii) electrodepositing a layer of nickel nanoparticles onto the inhibitor coated metal substrate in an electrolyte solution to form the corrosion resistant coating composition for a metal substrate.

In one embodiment, the phosphate corrosion inhibitor is sodium phosphate monobasic ($NaH_2PO_4$) and the nickel nanoparticles comprise fine equiaxed grains existing in the form of colonies with an average grain size of less than 100 nm.

In one embodiment, the electrolyte solution is a Watt's bath comprising i) an aqueous solution comprising 2-5 wt % NaCl relative to the total weight of the aqueous solution, ii) nickel sulfate, iii) nickel chloride and iv) boric acid ($H_3BO_3$).

In one embodiment, the electrolyte solution has a pH in the range of 3-5 and the electrodepositing is performed with the electrolyte solution having a temperature in the range of 35-65° C.

In one embodiment, the electrodepositing is performed by pulse electrodeposition.

In one embodiment, the pulse electrodeposition is performed at a maximum current amplitude of less than 10 A.

In one embodiment, the pulse electrodeposition comprises a repeating sequence of current amplitude with a pulse on-time of 1-5 msec and a pulse off-time of 5-15 msec.

In one embodiment, the duration of each pulse on-time is the same, the duration of each pulse off-time is the same, and the maximum current amplitude during each pulse on-time is the same in the repeating sequence.

According to a fourth aspect, the present disclosure relates to a method for inhibiting corrosion of a metal substrate comprising i) coating the metal substrate with a phosphate corrosion inhibitor to form an inhibitor coated metal surface an ii) electrodepositing a layer of nickel nanoparticles over the inhibitor coated metal substrate in an electrolyte solution to form a corrosion resistant metal substrate, wherein the method reduces the corrosion rate of the metal substrate in mils penetration per year (mpy) by 10-80% relative to the corrosion rate of a substantially similar metal substrate lacking the inhibitor, the layer of nickel nanoparticles or both.

In one embodiment, the phosphate corrosion inhibitor is sodium phosphate monobasic ($NaH_2PO_4$) and the nickel nanoparticles comprise fine equiaxed grains existing in the form of colonies with an average grain size of less than 100 nm.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
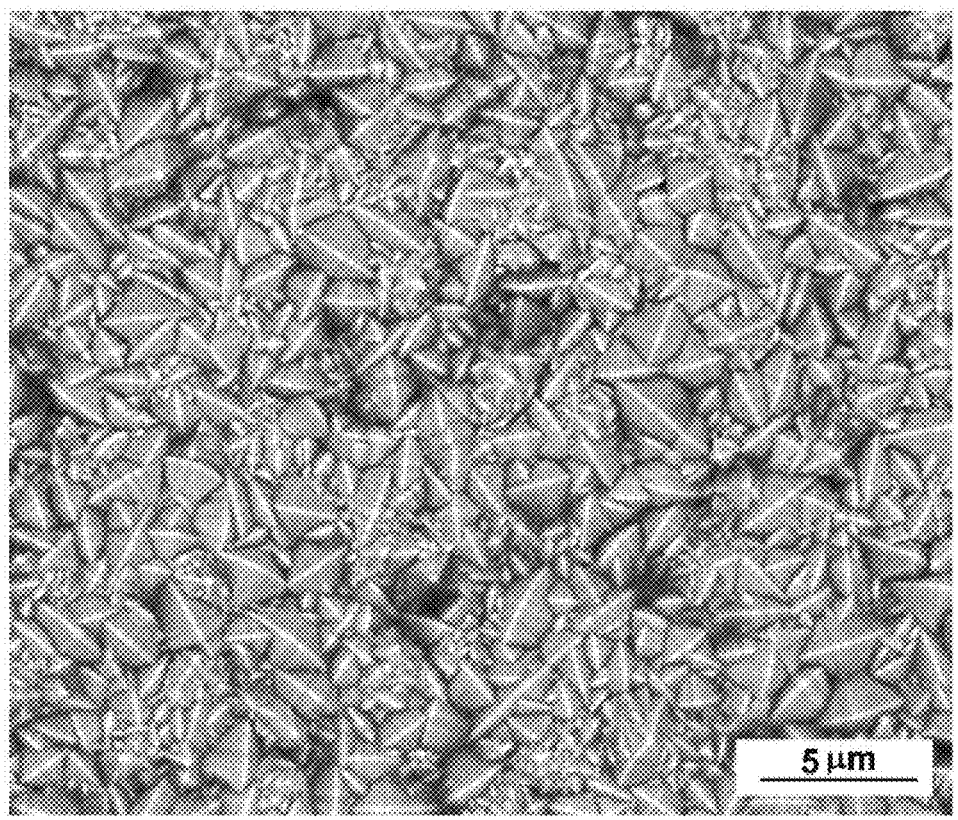
FIG. 1 is a scanning electron microscopy (SEM) micrograph image showing the surface morphology of nickel (Ni) produced by direct current (dc) electrodeposition.

Referring now to the drawings.

According to a first aspect, the present disclosure relates to a corrosion resistant coating composition for a metal substrate, comprising i) a first coating layer comprising a phosphate corrosion inhibitor and ii) a second coating layer comprising nickel (Ni) nanoparticles, wherein the first coating layer is disposed between the metal substrate and the second coating layer.

As used herein, "corrosion" refers to the process which converts refined metals to their more stable oxide. It is the gradual loss of a material (usually metals) by chemical reaction with their environment. Commonly, this means electrochemical oxidation of metal in reaction with an oxidant such as oxygen. Rusting, the formation of iron oxides is a well-known example of electrochemical corrosion producing oxide(s) and/or salt(s) of the original metal. Corrosion degrades the useful properties of materials and structures including strength, appearance and permeability to liquids and gases. Many structural alloys corrode merely from exposure to moisture in air, but the process can be strongly affected by exposure to certain substances. Corrosion can be concentrated locally to form a pit or crack, or it can extend across a wide area more or less uniformly corroding the surface. Because corrosion is a diffusion-controlled process, it occurs on exposed surfaces. Thus, methods to reduce the activity of the exposed surface, such as passivation, can increase a material's corrosion resistance.

As used herein, the term "substrate" or "metal substrate" refers to a metal surface onto which a single or a plurality of materials are coated, disposed or electrodeposited to form a coated substrate. The substrate may be a non-porous starting material that becomes coated, and the interface between the substrate and the coating material may be pore-free. Further, the bulk of the coating composition for a metal substrate may be the substrate, where the disposed or deposited material forms a thin coating layer on top of the surface of the substrate. Therefore, a metal surface that has been coated with one or more layers may also be defined as a "substrate" onto which an additional coating is added. The substrate may be flat with no hidden surfaces. The substrate may also have a rounded or curved shape with no hidden surfaces. The substrate may also be of a complex shape and have a plurality of protrusions and cavities with one or more hidden surfaces. A "hidden surface" may refer to a surface that does not have a direct line of sight and thus cannot be coated using a direct spray, stream, etc.

As used herein, "coating", "coating layer", "coat", or "coated" refers to a covering that is applied to a surface of a substrate (i.e. the metal substrate and/or the inhibitor coated metal substrate). The coating may "substantially cover" the surface, whereby the % surface area coverage of the surface being coated is at least 75%, at least 80%, at least 85%, at least 90%, at least 95%, at least 95%, at least 96%, at least 97%, at least 98%, at least 99%. In some cases, the coating may "incompletely cover", or only cover portions of the surface being coated, whereby the % surface area coverage of the surface being coated is less than 75%, less than 65%, less than 60%, less than 55%, less than 50%, less than 45%, less than 40%, less than 35%, less than 30%, less than 25%, less than 20%, less than 15%, less than 10%. The "coating" or "coat" may refer to one material (i.e. element, metal, non-metal, nickel, phosphate corrosion inhibitor, sodium phosphate monobasic) that covers a surface being coated, or alternatively, the coating may refer to a plurality of materials (i.e. mixtures) that cover a surface being coated. The plurality of materials may be applied to a surface as a mixture or sequential applications of individual materials. With sequential applications of individual materials, it may be possible to form multiple layers that are distinct from one another. These distinct layers may have a defined interface. The term "layer" or "layers" may be used synonymously with coating or coat. The term "exterior layer" may refer to the coating that covers a surface of the substrate as a whole. For instance, a substrate may be covered with two distinct layers, and both layers are referred to herein as the "external layer" and/or the "coating composition". In the case where two or more distinct materials are used to coat the substrate, but distinct layers are not formed, the mixture of the materials in the coating may also be referred to as the external layer. The term "coating" may also refer to a single application of a material, or a plurality of applications of the same material.

In a preferred embodiment, the first coating layer comprising a phosphate corrosion inhibitor substantially covers the surface of the metal substrate, where the first coating layer covers greater than 75%, preferably greater than 85%, preferably greater than 90%, preferably greater than 95% of the surface of the metal substrate. Alternatively, the first coating may be applied to only a portion of the surface of the metal substrate (i.e. incompletely cover), and the applied coating may still provide corrosion resistance. In a preferred embodiment, the second coating layer comprising nickel nanoparticles substantially covers the surface of the first coating layer, where the second coating layer covers greater than 75%, preferably greater than 85%, preferably greater than 90%, preferably greater than 95% of the surface of the first coating layer. Alternatively, the second coating may be applied to only a portion of the surface of the first coating layer (i.e. incompletely cover), and the applied coating may still provide corrosion resistance.

The coating thickness of the present disclosure may be varied depending on the coating materials and the process for applying the coating. In one embodiment, the average thickness of the first coating layer comprising a phosphate corrosion inhibitor is 1-150 µm, preferably 5-125 µm, preferably 20-110 µm, preferably 40-100 µm, preferably 50-90 µm, preferably 60-80 µm, preferably 65-75 µm. In a preferred embodiment, the average thickness of the second coating layer comprising nickel nanoparticles is 1-150 µm, preferably 5-125 µm, preferably 20-110 µm, preferably 40-100 µm, preferably 50-90 µm, preferably 60-80 µm, preferably 65-75 µm. In one embodiment, the average thickness of the first coating layer, the second coating layer or both is uniform. Alternatively the average thickness of the first coating layer, the second coating layer or both may be non-uniform. The term "uniform" refers to an average coating thickness that differs by no more than 25%, by no more than 10%, by no more than 5%, by no more than 4%, by no more than 3%, by no more than 2%, by no more than 1% at any given location on the surface of the coated material. The term "non-uniform" refers to an average coating thickness that differs by more than 25% at any given location on the surface of the coated material.

In one embodiment, the corrosion resistant coating composition of the present disclosure in any of its embodiments may impart corrosion resistance to at least one metal substrate from the exemplary group including, but not limited to, copper, copper alloys (e.g. brass or bronze), aluminum, aluminum alloys (e.g. aluminum-magnesium, nickel-aluminum, aluminum-silicon), nickel, nickel alloys (e.g. nickel-titanium or nickel-chromium), iron, iron alloys, carbon steels, alloy steels, stainless steels and tool steels, preferably one or more types of steel, more preferably carbon steel.

Steel is an alloy of iron and carbon that is widely used in construction and other applications because of its high tensile strength and low cost. Carbon, other elements, and inclusions within iron act as hardening agents that prevent the movement of dislocations that naturally exist in the iron atom crystal lattices. The carbon in typical steel alloys may contribute up to 2.1% of its weight.

Steels can be broadly categorized into four groups based on their chemical compositions: carbon steels, alloy steels, stainless steels, and tool steels. Carbon steels contain trace amounts of alloying elements and account for 90% of total steel production. Carbon steels can be further categorized intro three groups depending on their carbon content: low carbon steels/mild steels contain up to 0.3% carbon, medium carbon steels contain 0.3-0.6% carbon, and high carbon steels contain more than 0.6% carbon. Alloys steels contain alloying elements (e.g. manganese, silicon, nickel, titanium, copper, chromium and aluminum) in varying proportions in order to manipulate the steel's properties, such as its hardenability, corrosion resistance, strength, formability, weldability or ductility. Stainless steels generally contain between 10-20% chromium as the main alloying element and are valued for high corrosion resistance. With over 11% chromium, steel is about 200 times more resistant to corrosion than mild steel. These steels can be divided into three groups based on their crystalline structure: austenitic steels, ferritic steels and martensitic steels. Tool steels contain tungsten, molybdenum, cobalt and vanadium in varying quantities to increase heat resistance and durability, making them ideal for cutting and drilling equipment.

In terms of the present disclosure, the metal substrate may be steel, carbon steel, low carbon steel, mild steel, medium carbon steel, high carbon steel, alloy steel, stainless steel, austenitic steel, ferritic steel, martensitic steel, tool steel or mixtures thereof, most preferably the metal substrate is a carbon steel with a carbon content of 0.2-1.0%.

In the present disclosure, the corrosion resistant coating composition for a metal substrate comprises a first coating layer comprising a phosphate corrosion inhibitor, preferably sodium phosphate monobasic ($NaH_2PO_4$). The metal substrate coated with the first coating layer may be referred to as an "inhibitor coated metal substrate".

As used herein, a "corrosion inhibitor" refers to a chemical compound or composition that when added to a material, typically a metal or an alloy decreases the corrosion rates of the material. The effectiveness of a corrosion inhibitor depends on fluid composition, quantity of fluid and flow regime. A common mechanism for inhibiting corrosion involves formation of a coating, often a passivation layer, which prevents access of the corrosive substance to the metal. The nature of a corrosion inhibitor may depend on the material being protected (most commonly metal objects) and the corrosive agent(s) to be neutralized. Corrosive agents may include, but are not limited to, oxygen, hydrogen sulfide and carbon dioxide.

Generally, the mechanism of the inhibitor includes one of the following: i) the inhibitor is chemically adsorbed (chemisorption) on the surface of the metal and forms a protective thin film with inhibitor effect or by combination between inhibitor ions and the metallic surface, ii) the inhibitor leads a formation of a film by oxide protection of the base metal, and/or iii) the inhibitor reacts with a potential corrosive component present in media and the product is a complex. Corrosion inhibitors can be chemicals either synthetic or natural and can be classified by i) the chemical nature as organic or inorganic, ii) the mechanism of action as anodic, cathodic or an anodic-cathodic mix and by adsorption action or iii) as oxidants or not oxidants. In general, the inorganic inhibitors have cathodic mechanisms of action or anodic mechanisms of action. The organic inhibitors have both mechanisms of action, cathodic and anodic and afford protection by a film adsorption.

Cathodic corrosion inhibitors prevent the occurrence of the cathodic reaction of the metal. These inhibitors have metal ions able to produce a cathodic reaction due to alkalinity, thus producing insoluble compounds that may precipitate selectively on cathodic sites. This may deposit over the metal a compact and adherent film that restricts the diffusion of reducible species in these areas. This may increase the impedance of the surface and the diffusion restriction of the reducible species, that is, the oxygen diffusion and electrons conductive in these areas. Exemplary cathodic inorganic inhibitors include, but are not limited to, the ions of magnesium, zinc, and nickel that may react with the hydroxyl (OH—) of water to form insoluble hydroxides ($Mg(OH)_2$, $Zn(OH)_2$, $Ni(OH)_2$) which are deposited on the cathodic site of the metal surface, protecting it, polyphosphates, phosphonates, tannins, lignins, calcium salts and mixtures thereof. Anodic inhibitors (also referred to as passivation inhibitors) act by reducing anodic reaction, blocking the anode reaction and supporting the natural reaction of passivation metal surface, they may also act by forming a film adsorbed on the metal. In general, the inhibitors react with the corrosion product, initially formed, resulting in a cohesive and insoluble film on the metal surface. Exemplary anodic inorganic inhibitors include, but are not limited to, nitrates, molybdates, sodium chromates, phosphates, hydroxides, silicates and mixtures thereof.

The efficiency of an organic inhibitor depends on i) chemical structure and size of the organic molecule, ii) aromaticity and/or conjugated bonding and carbon chain length, iii) types and number of bonding atoms or groups in the molecule (either $\pi$ or $\sigma$), iv) nature and the charges of the metal surface of adsorption mode like bonding strength to metal substrate, v) ability for a layer to become compact or cross-linked, vi) capability to form a complex with the atom as a solid within the metal lattice and/or vii) type of the environment and adequate solubility in the environment. Organic inhibitors, such as polymers or conducting polymers, form an electrically insulating or chemically impermeable coating on exposed metal surfaces that suppresses electrochemical reactions. Inhibition of metal corrosion by organic inhibitors is influenced by the presence of heteroatoms (N, O and S) as the inhibitor molecules interfere with anodic or cathodic reactions occurring on the metal surfaces thus arresting or minimizing corrosion processes. The greater polarizability of the lone pair of electrons in the third period elements makes them better inhibitors as a result of formation of coordinate-type bonds to cover and safeguard the metal surface. Corrosion inhibitors possessing N, O, or S atoms in the molecule, heterocyclic compounds and $\pi$ electrons generally have hydrophilic or hydrophobic parts that are ionizable. The polar function is usually regarded as the reaction center for the establishment of the adsorption process. The organic inhibitor that contains oxygen, nitrogen, and/or sulfur is adsorbed on the metallic surface blocking the active corrosion sites. The most effective and efficient organic inhibitors are compounds that have π-bonds. Exemplary organic inhibitors include, but are not limited to, amines, urea, mercaptobenzothiazole (MBT), benzotriazole, tolyltriazole, aldehydes, heterocyclic nitrogen compounds, sulfur containing compounds, acetylenic compounds, ascorbic acid, succinic acid, tryptamine, caffeine, extracts of natural substances, as well as inhibitors that act in the vapor phase (i.e. volatile corrosion inhibitors) including, but not limited to, dicyclohexylammonium benzoate, diisopropylammonium nitrite or benzoate, ethanolamine benzoate or carbonate, the combination of urea and sodium nitrite and mixtures thereof.

In terms of the present disclosure, the first coating layer comprising a corrosion inhibitor of the corrosion resistant coating composition for a metal substrate of the present disclosure may comprise an organic corrosion inhibitor, an inorganic corrosion inhibitor, an anodic corrosion inhibitor, a cathodic corrosion inhibitor, a anodic-cathodic mix corrosion inhibitor and mixtures thereof, preferably an anodic inorganic corrosion inhibitor, more preferably a phosphate corrosion inhibitor. Phosphate inhibitors can both reduce corrosion by forming a protective layer on the surface and can also be beneficial by inhibiting calcite precipitation (i.e. scaling) on the surface. Sodium orthophosphate, zinc orthophospnate (ZOP) and polyphosphate are commonly used corrosion inhibitors. Blends of poly/orthophosphate are also used for corrosion control. Orthophosphates are generally used in the form of phosphoric acid ($H_3PO_4$), or neutralized orthophosphoric acid-monosodium phosphate ($NaH_2PO_4$), disodium phosphate ($Na_2HPO_4$), and trisodium phosphate ($Na_3PO_4$) to mitigate corrosion. Orthophosphate chemicals form passivating films on anodic sites to suppress electrochemical reactions. In terms of the present disclosure, the phosphate corrosion inhibitor of the first coating layer may be orthophosphate, sodium orthophosphate, zinc orthophosphate, polyphosphate and mixtures thereof, preferably orthophosphate or sodium orthophosphate, most preferably sodium phosphate monobasic ($NaH_2PO_4$). In another embodiment, additional alkali metals (i.e. lithium, sodium, potassium), additional alkaline earth metals (i.e. beryllium, magnesium, calcium) and additional group 12 elements (i.e. zinc, cadmium) are envisioned to serve as the counterion to the orthophosphate moiety, preferably zinc, potassium or sodium, more preferably zinc or sodium, most preferably sodium.

In the present disclosure, the corrosion resistant coating composition for a metal substrate comprises a second coating layer comprising nickel nanoparticles. The metal substrate coated with the first coating layer may be referred to as an "inhibitor coated metal substrate" and the inhibitor coated metal substrate coated with the second coating layer, wherein the first coating layer is disposed between the metal substrate and the second coating layer may be referred to as the "coated metal substrate" or "corrosion resistant coated metal substrate".

Nickel (Ni, atomic number 28) is a silver/white lustrous metal with a slight golden tinge. Nickel belongs to the transition metals and is hard and ductile. Pure nickel shows a significant chemical activity that can be observed when nickel is powdered to maximize the exposed surface area; larger pieces of the metal are slow to react with air at ambient conditions due to the formation of a protective oxide surface. Due to nickel's slow rate of oxidation at room temperature, it is considered corrosion resistant. This has led to its use in plating metals such as iron and brass, coating chemistry equipment, and manufacturing certain alloys that retain a high silvery polish. An important source of nickel is the iron ore limonite, which can contain 1-2% nickel, nickel's other important ore minerals include garnierite and pentlandite. Nickel is one of four elements that are ferromagnetic around room temperature. The metal is chiefly valuable for the alloys it forms.

Nickel is a silver/white metal with a slight golden tinge that takes a high polish. The unit cell of nickel is a face-centered cube with the lattice parameter of 0.352 nm, giving an atomic radius of 0.124 nm. This crystal structure is stable to pressures of at least 70 GPa. Naturally occurring nickel is composed of five stable isotopes; $^{58}Ni$, $^{60}Ni$, $^{61}Ni$, $^{62}Ni$ and $^{64}Ni$ with $^{58}Ni$ being the most abundant (68.077% natural abundance). Nickel occurs most often in combination with sulfur and iron in pentlandite, with sulfur in millerite, with arsenic in the mineral nickeline and with arsenic and sulfur in nickel galena. Nickel is commonly found as the alloys kamacite and taenite. The bulk of nickel comes from two types of ore deposits. The first are laterites, where the principal ore minerals are nickeliferous limonite (Fe,Ni)O (OH) and garnierite (a hydrous nickel silicate) $(Ni,Mg)_3Si_2O_5(OH)_4$. The second are magmatic sulfide deposits, where the principal ore mineral is pentlandite $(Ni,Fe)_9S_8$. The most common oxidation state of nickel is nickel+2, but compounds of $Ni^0$, $Ni^+$ and $Ni^{3+}$ are well known, as well as exotic oxidation states $Ni^{2-}$, $Ni^{1-}$, and $Ni^{4+}$.

The second coating layer comprising nickel (Ni) nanoparticles refers to a nickel rich material or a deposit of substantially nickel material (i.e. greater than 60%, preferably greater than 70%, preferably greater than 80%, preferably greater than 90%, preferably greater than 95%). It is further envisaged that in addition to nickel, various non-nickel materials (i.e. metals and non-metals) may be present in the second coating layer comprising nickel nanoparticles including, but not limited to aluminum, copper, lead, iron, tin, titanium, zinc, chromium, cobalt, molybdenum, tungsten, manganese, tantalum, zirconium, niobium, rhenium, ruthenium, yttrium, vanadium, carbon, bronze, metal oxides thereof, metal sulfides thereof, calcium oxide, magnesium oxide, aluminum oxide, manganese oxide, boron, silicon, silica, sulfur, phosphorous and combinations thereof. Additionally, nickel alloys and super alloys may be present in the second coating layer comprising nickel nanoparticles including, but not limited to, nickel-aluminum alloys, nickel-chromium alloys, nickel-titanium alloys, Hastelloy, Inconel, Waspaloy, Rene alloys, Haynes alloys, Incoloy, MP98T, TMS alloys, CMSX single crystal alloys and the like. The total weight % of these non-nickel species relative to the total wt % of the second coating layer comprising nickel nanoparticles is typically no more than 40%, preferably no more than 30%, preferably no more than 20%, preferably no more than 15%, preferably no more than 10%, preferably no more than 5%, preferably no more than 4%, preferably no more than 3%, preferably no more than 2%, preferably no more than 1%.

In a preferred embodiment, the nickel nanoparticles of the present disclosure refers to a deposit of substantially nickel material made through an electroplating or electrodepositing process that coats a substrate and/or an inhibitor coated substrate. In the present disclosure, particles or nanoparticles (depending on their size) that are deposited onto the substrate may also be referred to as grains. As used herein, grains refer to distinguishable pieces that comprise a system, and "granular" or "granularity" describes the extent to which a material or system comprises distinguishable pieces or grains. It may refer to either the extent to which a larger entity is subdivided, or the extent to which groups of smaller indistinguishable entities have joined together to become larger distinguishable entities or colonies. Coarse-grained materials or systems have fewer, larger discrete components than fine-grained materials or systems. A coarse-grained description of a system regards large subcomponents while a fine-grained description regards smaller components of which the larger ones are composed. In a preferred embodiment, the nickel nanoparticles are fine equiaxed grains existing in the form of colonies that are separated by crevices (FIG. 2). As used herein, "equiaxed" grains refer to grains that have axes of approximately the same length. In a preferred embodiment, the longest grain lengths vary by no more than 30%, preferably no more than 25%, preferably no more than 20%, preferably no more than 15%, preferably no more than 10%. Ideally, the grain size of the nickel nanoparticles is small, especially in the initial stage of deposition, preferably as fine as ~10 nm. In another embodiment, the nickel nanoparticles may be coarse compact pyramidal-shaped grains (FIG. 1) with a maximum grain size as high as 3 μm.

Nanoparticles are particles between 1 and 100 nm ($10^2$ and $10^7$ atoms) in size. A particle is defined as a small object that behaves as a whole unit with respect to its transport and properties. The exceptionally high surface area to volume ratio of nanoparticles may cause the nanoparticles to exhibit significantly different or even novel properties from those observed in individual atoms/molecules, fine particles and/or bulk materials. Nanoparticles can be classified according to their dimensions. Three-dimensional nanoparticles have all dimensions of less than 100 nm, and generally encompass isodimensional nanoparticles. Examples of three dimensional nanoparticles include, but are not limited to, nanoparticles, nanospheres, nanogranules and nanobeads. Two-dimensional nanoparticles have two dimensions of less than 100 nm, generally including diameter. Examples of two-dimensional nanoparticles include, but are not limited to, nanotubes, nanofibers and nanowhiskers. One-dimensional nanoparticles have one dimension of less than 100 nm, generally thickness. Examples of one-dimensional nanoparticles include, but are not limited to, nanosheets, nanoplatelets, nanolaminas and nanoshells. The nickel nanoparticles of the present disclosure are preferably three-dimensional nanoparticles, but may also be one-dimensional, two-dimensional, three-dimensional or mixtures thereof.

For substantially spherical or granular nickel nanoparticles, average particle size refers to the average longest linear dimension of the nickel nanoparticles and any of the length, width, height or diameter. In one embodiment, the nickel nanoparticles of the present disclosure have an average particle size or average grain size of less than 100 nm, preferably 1-80 nm, preferably 2-70 nm, preferably 3-60 nm, preferably 4-50 nm, preferably 5-40 nm, preferably 8-25 nm, preferably 10-20 nm and are considered to be "fine" grains. In another embodiment, the nickel nanoparticles and/or particles of the present disclosure may have a maximum particle size or maximum grain size of up to 5000 nm, preferably up to 3000 nm, preferably 10-2000 nm, preferably 25-1500 nm, preferably 50-1000 nm, preferably 75-500 nm, preferably 100-250 nm and are considered to be "coarse" grains. The size of the nickel nanoparticles may be a result of the technique of their formation and may impact the level of corrosion resistance the coating composition imparts. It is envisaged that the size may vary from these ranges and still provide acceptable corrosion resistance.

In one embodiment, the nickel nanoparticles of the present disclosure are monodisperse, having a coefficient of variation or relative standard deviation, expressed as a percentage and defined as the ratio of the particle size standard deviation (σ) to the particle size mean (μ) multiplied by 100 of less than 25%, preferably less than 20%, preferably less than 15%, preferably less than 12%, preferably less than 10%, preferably less than 8%, preferably less than 6%, preferably less than 5%, preferably less than 4%, preferably less than 3%, preferably less than 2%. In one embodiment, the nickel nanoparticles of the present disclosure are monodisperse having a particle size distribution ranging from 80% of the average particle size to 120% of the average particle size, preferably 90-110%, preferably 95-105% of the average particle size.

Nanoparticles are named for the real-world shapes that they appear to represent. These morphologies sometimes arise spontaneously as an effect of the synthesis or from the innate crystallographic growth patterns of the materials themselves. In a preferred embodiment, the nickel nanoparticles of the present disclosure are in the form of a nanoparticle or nanograins which are spherical, substantially spherical (e.g. oval, oblong, etc.) or substantially granular in shape. Alternatively, it is envisaged that the nickel nanoparticles may have a more polygonal shape and may be generally cubic or rectangular. However, the nickel nanoparticles disclosed herein may have various shapes other than spheres or grains and may be of any shape that provides desired corrosion resistant activity and/or desired properties in the resulting corrosion resistant coating composition for a metal substrate. In a preferred embodiment, the nickel nanoparticles have a uniform granular or spherical morphology. In another embodiment, the nickel nanoparticles may comprise a mixture of additional morphologies (i.e. polygonal), preferably less than 10%.

In another embodiment, it is envisaged that the nickel nanoparticles may be synthesized and formed into a variety of morphologies and forms including, but not limited to nanoparticles, nanogranules, nanograins, nanosheets, nanoplatelets, nanocrystals, nanospheres, nanorectangles, nanotriangles, nanopentagons, nanohexagons, nanoprisms, nanodisks, nanocubes, nanowires, nanofibers, nanoribbons, nanorods, nanotubes, nanocylinders, nanowhiskers, nanoflakes, nanofoils, nanopowders, nanoboxes, nanostars, tetrapods, nanobelts, nanourchins, nanoflowers, etc. an mixtures thereof.

Nanoparticle characterization is necessary to establish understanding and control of nanoparticle synthesis, assembly and application. In one embodiment, the nanoparticles are characterized by at least one technique selected from the group consisting of electron microscopy (TEM, SEM, FESEM), powder X-ray diffraction (XRD), atomic force microscopy (AFM), and energy dispersive X-ray spectroscopy (EDX). In another embodiment, it is envisaged that characterization is done using a variety of other techniques. Exemplary techniques include, but are not limited to, thermogravimetric analysis (TGA), Fourier transform infrared spectroscopy (FT-IR), ultraviolet-visible spectroscopy (UV-Vis), dynamic light scattering (DLS), X-ray photoelectron spectroscopy (XPS), X-ray fluorescence (XRF), matrix-assisted laser desorption/ionization time-of-flight mass spectrometry (MALDI-TOF), Raman spectroscopy, Rutherford backscattering spectrometry (RBS), dual polarization interferometry, nuclear magnetic resonance (NMR) and/or mixtures thereof.

As used herein, the term nanoindentation or nanoindentation hardness is a variety of instrumented indentation hardness tests applied to small volumes. Indentation is one of the most commonly applied means of testing the mechanical properties of materials. The nanoindentation technique was developed to measure the hardness of small volumes of material. In traditional indentation tests (macro or micro indentation), a hard tip whose mechanical properties are known (frequently comprising a very hard material such as diamond) is pressed into a sample whose properties are unknown. The load placed on the indenter tip is increased as the tip penetrates further into the specimen and soon reaches a user-defined value. At this time, the load may be held constant for a period or removed. The area of the residual indentation in the sample is measured and the hardness (H) is defined as the maximum load ($P_{max}$) divided by the residual indentation area ($A_r$). In nanoindentation, small loads and tip sizes are used, so the indentation area may only be a few square micrometers or nanometers. Atomic force microscopy and/or scanning electron microscopy may be utilized to image the indentation. Alternatively, an indenter with a geometry known to high precision (i.e. a Berkovich tip having a three-sided pyramid geometry) is employed and the area of the indent is determined using the known geometry of the indentation tip. In a preferred embodiment, the second coating layer comprising nickel (Ni) nanoparticles of the present disclosure in any of its embodiments has an instrumented nanohardness in the range of 2000-4000 MPa, preferably 2500-3900 MPa, preferably 2750-3800 MPa, preferably 3000-3700 MPa, preferably 3150-3600 MPa, more preferably 3300-3500 MPa.

Corrosion rate is the speed at which metals undergo deterioration within a particular environment. The rate may depend on environmental conditions and the condition or type of metal. Factors often used to calculate or determine corrosion rate include, but are not limited to, weight loss (reduction in weight during reference time), area (initial surface area), time (length of reference time) and density. Corrosion rate is typically computed using mils per year (mpy). Mils penetration per year (mpy) is a unit of measurement equal to approximately one thousandth of an inch. It is used to gauge a coupon's corrosion rate. The unit is typically applied in industries like manufacturing and engineering to measure coating thickness or tolerance. Mils penetration per year is commonly referred to as mil in the U.S. measurement system. In a preferred embodiment, the corrosion resistant coating composition of the present disclosure in any of its embodiments imparts a corrosion rate in the range of 0.2-5.0 mils penetration per year (mpy) to the metal substrate, preferably 0.25-4.0 mpy, preferably 0.3-3.0 mpy, preferably 0.5-2.5 mpy, more preferably 0.5-2.0 mpy, more preferably 0.6-1.5 mpy, more preferably 0.7-1.25 mils penetration per year (mpy).

Figure 10:
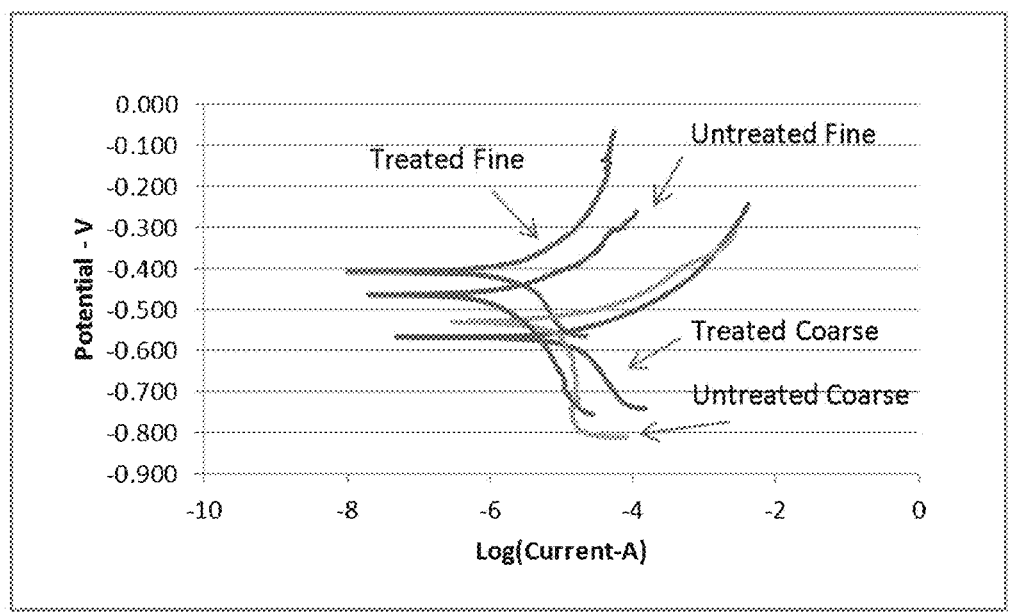
FIG. 10 is a potentiodynamic polarization plot obtained for coarse Ni deposited on untreated carbon steel, fine Ni deposited on untreated carbon steel, coarse Ni deposited on inhibitor treated carbon steel, and fine Ni deposited on inhibitor treated carbon steel.

Most metallic corrosion occurs via electrochemical reactions at the interface between the metal and an electrolyte solution. Corrosion normally occurs at a rate determined by an equilibrium between opposing electrochemical reactions. One reaction is the anodic reaction, in which a metal is oxidized, releasing electrons into the metal. The other is the cathodic reaction, in which a solution species (often $O_2$ or $H^+$) is reduced, removing electrons from the metal. When these two reactions are in equilibrium, the flow of electrons from each reaction is balanced, and no net electron flow (electrical current) occurs. The potential of the substrate or metal is the means by which the anodic and cathodic reactions are kept in balance. The equilibrium potential assumed by the substrate or metal in the absence of electrical connection or electrical current is called the open-circuit potential, the corrosion potential, or the zero current potential (ZCP), as shown in FIG. 10. As used herein, zero current potential refers to the equilibrium potential assumed by a substrate at open circuit (zero current flow). In a preferred embodiment, the corrosion resistant coating composition of the present disclosure in any of its embodiments imparts a zero current potential (ZCP) in the range of −250 mV to −600 mV to the metal substrate, preferably −300 mV to −575 mV, preferably −350 mV to −550 mV, more preferably −375 mV to −500 mV, more preferably −400 mV to −475 mV, more preferably −405 mV to −470 mV.

Electrical impedance is the measure of opposition that a circuit presents to a current when voltage is applied. Electrical impedance spectroscopy (EIS) has been applied to the study of corrosion systems and been proven to be a powerful and accurate method for measuring corrosion rates via the electrical properties of a medium as a function of frequency. It is based on the interaction of an external field with the electric dipole moment of the sample. The resistance of the coating composition described herein, is a measurement of impedance by applying Ohm's law to a reduction in current of an applied voltage, detected in the presence and absence of the coating composition described herein. In a preferred embodiment, the coating composition of the present disclosure in any of its embodiments imparts an electrical impedance of 0.5-100Ω to the metal substrate, preferably 0.75-90Ω, preferably 1.0-85Ω, preferably 1.5-80Ω, preferably 2.0-75Ω, preferably 2.5-70Ω, preferably 5-65Ω, preferably 10-60, more preferably 20-50Ω, more preferably 30-40Ω.

According to a second aspect, the present disclosure relates to a coated metal substrate comprising i) a metal substrate, ii) a first coating layer comprising a phosphate corrosion inhibitor, and iii) a second coating layer comprising nickel (Ni) nanoparticles wherein the first coating layer is disposed between the metal substrate and the second coating layer. In a preferred embodiment, the phosphate corrosion inhibitor is sodium phosphate monobasic ($NaH_2PO_4$) and the nickel nanoparticles comprise fine equiaxed grains existing in the form of colonies with an average grain size of less than 100 nm. In one embodiment, the metal substrate comprises carbon steel.

According to a third aspect, the present disclosure relates to a method of forming the corrosion resistant coating composition for a metal substrate of the present disclosure in one or more of its embodiments. The method comprises i) applying a coating of phosphate corrosion inhibitor to the metal substrate to form an inhibitor coated metal substrate and ii) electrodepositing a layer of nickel nanoparticles over the inhibitor coated metal substrate in an electrolyte solution to form the corrosion resistant coating composition for a metal substrate. In a preferred embodiment, the phosphate corrosion inhibitor is sodium phosphate monobasic ($NaH_2PO_4$) and the nickel nanoparticles comprise fine equiaxed grains existing in the form of colonies with an average grain size of less than 100 nm. In one embodiment, the metal substrate comprises carbon steel.

In one step of the method, a coating of phosphate corrosion inhibitor is applied to the metal substrate to form an inhibitor coated metal substrate. The application of the coating of phosphate corrosion inhibitor may be achieved by dipping, brushing, spraying, painting or spin coating the metal substrate with the phosphate corrosion inhibitor. Dipping refers to a process in which an object or surface is immersed in the inhibitor or a solution comprising the inhibitor to adhere the inhibitor to a surface of the metallic substrate, brushing refers to a bristle application, spraying refers to the use of an air pressurized nozzle for dispensing the inhibitor, painting refers to the use of rollers or spraying lacking air pressurization and spin coating refers to the use of centrifugal force in applying the phosphate corrosion inhibitor.

In a preferred embodiment, the method and the application of the coating of phosphate corrosion inhibitor involves immersing at least one surface of the metal substrate in a solution comprising at least one dissolved phosphate corrosion inhibitor. In a preferred embodiment the concentration of phosphate corrosion inhibitor in the solution is in the range of 0.1-10 M, preferably 0.5-5 M, preferably 0.75-2.5 M, preferably 1-2 M and the solution is an aqueous solution of the phosphate corrosion inhibitor. In a preferred embodiment, the immersion is carried out over a period of time in the range of 2-48 hr, preferably 8-36 hr, preferably 12-32 hr, preferably 18-30 hr, preferably 20-28 hr, or 24 hr.

Cleanliness is often important to successful electroplating, since molecular layers, such as oil or surfactants, can prevent adhesion of the coating. In one embodiment, the method further comprises cleaning procedures. These cleaning procedures may be performed on the metal substrate before applying a coating of phosphate corrosion inhibitor, on the inhibitor coated metal substrate after applying a coating of phosphate corrosion inhibitor and before electrodepositing a layer of nickel nanoparticles, or both. Therefore, the corrosion resistant coating composition may be substantially free of oils and/or surfactants. Exemplary cleaning procedures include, but are not limited to, solvent cleaning, hot alkaline detergent cleaning, electro-cleaning, acid treatment, ASTM B322 [incorporated herein by reference in its entirety], and the like. In addition the present method may further comprise common industrial test for cleanliness such as the waterbreak test, wherein the surface is thoroughly rinsed and held vertical, hydrophobic contaminants such as oils cause the water to bead and break up, allowing the water to drain rapidly. Perfectly clean metal surfaces are hydrophilic and will retain an unbroken sheet of water that does not bead up or drain off. A version of this test is described in ASTM F22 [incorporated herein by reference in its entirety]. The test does not detect hydrophilic contaminants, but the electrodeposition process can displace these easily as the electrolyte solutions are water-based. In one embodiment, the method further comprises metallographically grounding and polishing the substrate, degreasing the substrate with acetone, and/or rinsing the substrate with water before electrodepositing a layer of nickel nanoparticles.

In one step of the method, a layer of nickel nanoparticles is electrodeposited over the inhibitor coated metal substrate in an electrolyte solution to form the corrosion resistant coating composition for a metal substrate. As used herein, "electrodeposition" may refer to i) electroplating, a process that uses electric current to reduce dissolved metal cations so that they may form a coherent metal coating on an electrode, ii) electrophoretic deposition, a term for a broad range of industrial processes including, but not limited to, electrocoating, e-coating, cathodic electrodeposition, anodic electrodeposition, electrophoretic coating, and/or electrophoretic painting, and iii) underpotential deposition, a phenomenon of electrodeposition of a species (typically reduction of a metal cation to a solid metal) at a potential less negative than the equilibrium (Nernst) potential for the reduction of this metal. In a preferred embodiment, the electrodeposition refers generally to electroplating.

As used herein "electroplating" refers to a process that uses electric current to reduce dissolved metal cations so that they form a coherent metal coating on an electrode. The term may also be used for electrical oxidation of anions onto a solid substrate. Electroplating is primarily used to change the surface properties of an object (i.e. abrasion and wear resistance, corrosion protection, lubricity, aesthetic qualities and the like), but may also be used to build up thickness on undersized parts or to form objects by electroforming. The process used in electroplating is called electrodeposition. It is analogous to a galvanic cell acting in reverse. The part to be plated or deposited is the cathode of the circuit. In one technique, the anode is made of the metal to be plated on the part. Both components (anode and cathode) are immersed in a solution called an electrolyte solution containing one or more dissolved metal salts as well as other ions that permit the flow of electricity, or other particles which may also coat the substrate. A power supply supplies a current to the anode, oxidizing the metal atoms that it comprises and allowing them to dissolve in the solution. At the cathode, the dissolved metal ions in the electrolyte solution are reduced at the interface between the solution and the cathode, such that they are deposited and/or "plate out" onto and coat the cathode. The rate at which the anode is dissolved is equal to the rate at which the cathode is plated, in relation to the current through the circuit. In the manner, the ions in the electrolyte solution or bath are continuously replenished by the bath. Other electroplating process may use a non-consumable anode such as lead or carbon. In these techniques, ions of the metal to be plated must be periodically replenished in the bath as they are drawn out of solution.

In the process of electroplating or electrodeposition the cations associate with the anions in the solution. These cations are reduced at the cathode to deposit in the metallic, zero valence state. The result is the effective transfer of the metal from the anode surface to a plate covering or acting as the cathode. The plating is most commonly a single metallic element, not an alloy; however, some alloys can be electrodeposited (i.e. brass or solder). Many plating baths or solutions include cyanides of other metals (i.e. potassium cyanide) in addition to cyanides of the metal to be deposited. These free cyanides facilitate anode corrosion, help to maintain a constant metal ion level and contribute to conductivity. Additionally, non-metal chemicals such as carbonates and phosphates may be added to increase conductivity. When plating or depositing is not desired on certain areas of the substrate, "stop-offs" are applied to prevent the bath from coming in contact with the substrate. Typical stop-offs include tape, foil, lacquers, and waxes.

In the direct current electrodeposition method, the power supply supplies a continuous and ideally constant direct current to the anode. In the striking method, a special plating deposit termed a "strike" or "flash" may be used to form a very thin (~less than 0.1 μm thick) plating with high quality and good adherence to the substrate. This may serve as a foundation for subsequent plating processes. A strike uses a high current density and a bath with a low ion concentration. The process is slow, so more efficient plating process may be used once the desired strike thickness is obtained. The striking method is also used in combination with the plating of different metals. If it is desirable to plate one type of deposit onto a metal to improve corrosion resistance but this metal has inherently poor adhesion to the substrate, a strike can be first deposited that is compatible with both. In the electrochemical deposition method, a technique is used for the growth of metals and conducting metal oxides. This is advantageous in that the thickness and morphology of the nanostructure can be precisely controlled by adjusting the electrochemical parameters, relatively uniform and compact deposits can be synthesized in template-based structures, higher deposition rates are obtained and the equipment is inexpensive not requiring a high vacuum or high reaction temperature. In the pulse electroplating or pulse electrodeposition (PED) method the electroplating process is modified simply. The process involves the swift alternating of the potential or current between two different values resulting in a series of pulses ideally of equal amplitude, duration and polarity, separated by zero current. By changing the pulse amplitude and width, it is possible to change the deposited film's composition and thickness.

In the brush electroplating method, localized areas of entire items are plated using a brush saturated with plating solution. The brush, typically a stainless steel body wrapped with a cloth material that both holds the plating solution and prevents direct contact with the item being plated, is connected to the positive side of a low voltage direct current power source, and the item to be plated is connected to the negative. The operator may dip the brush in the plating solution, and then apply it to the item, moving the brush continually to get an even distribution of the plating material. Advantages of brush electroplating include portability, ability to plate items that cannot be tank plated (i.e. due to a very large size), low or no masking requirements, and comparatively low plating solution volume requirements. It does require greater operator involvement and may be limited in plate thickness. In the electroless deposition method, only one electrode and no external source of electric current is used. The solution must contain a reducing agent in the electroless process. In principle, any hydrogen-based reducer can be used although the redox potential of the reducer half-cell must be high enough to overcome the energy barriers inherent in liquid chemistry. Typical reducers include, but are not limited to, hypophosphite (Ni) and low molecular weight aldehydes (Au, Ag, Cu). The major benefit of electroless deposition is the that the power sources and plating baths are not needed, reducing production costs, the technique can also plate diverse shapes and types of surfaces. It is generally slower and cannot create as thick of plates of metal. In terms of the present disclosure, the electrodeposition may be direct current electrodeposition, striking electrodeposition, electrochemical deposition, pulse electrodeposition, brush electrodeposition, electroless deposition or mixtures thereof; preferably the electrodepositing is performed by direct current electrodeposition or pulse electrodeposition, most preferably pulse electrodeposition.

Nickel electrodeposition refers to technique of electrodepositing or electroplating a thin layer of nickel or nickel nanoparticles onto a metal object. The nickel layer may be decorative, provide corrosion resistance, wear resistance, or used to build up worn or undersized parts. The substrate is immersed into an electrolyte solution and is used as the cathode. The nickel anode is dissolved into the electrolyte in the form of nickel ions, the ions travel through the solution and deposit on the cathode.

In nickel electrodeposition, a Watt's bath can be used to deposit both bright and semi-bright nickels as a thin layer onto a metal substrate. In a preferred embodiment, the electrolyte solution and/or the electrochemical cell is a Watt's bath. In a preferred embodiment, the electrolyte solution is a Watt's bath and comprises nickel sulfate ($NiSO_4.6H_2O$), nickel chloride ($NiCl_2.6H_2O$) and boric acid ($H_3BO_3$) in an aqueous solution, preferably an aqueous sodium chloride (NaCl) solution. In a preferred embodiment, nickel sulfate is present in the electrolyte solution or Watt's bath at a concentration of 150-300 g/L, preferably 200-300 g/L, preferably 220-300 g/L, preferably 230-280 g/L, more preferably 240-260 g/L, or 250 g/L. In a preferred embodiment, nickel chloride is present in the electrolyte solution or Watt's bath at a concentration of 30-150 g/L, preferably 30-125 g/L, preferably 30-100 g/L, preferably 30-75 g/L, more preferably 40-60 g/L, or 50 g/L. In a preferred embodiment, boric acid is present in the electrolyte solution or Watt's bath at a concentration of 30-55 g/L, preferably 30-52 g/L, preferably 30-50 g/L, preferably 30-45 g/L, more preferably 30-40 g/L, more preferably 32.5-37.5 g/L, or 35 g/L. In a preferred embodiment, the aqueous solution is a NaCl solution comprising 2-5 wt % NaCl relative to the total weight of the aqueous solution, preferably 2.5-4.5 wt %, preferably 3-4 wt %, more preferably 3.25-3.75 wt %, or 3.5 wt % NaCl relative to the total weight of the aqueous solution.

In a preferred embodiment, the electrolyte solution and/or Watt's bath has a pH in the range of 3.0-5.0, preferably 3.0-4.5, preferably 3.0-4.0, more preferably 3.3-3.9 or 3.6. In a preferred embodiment, the electrodepositing is performed with the electrolyte solution and/or Watt's bath having a temperature in the range of 35-65° C., preferably 40-65° C., preferably 40-60° C., preferably 40-55° C., preferably 40-50° C., more preferably 42.5-47.5° C., or 45° C. These Watt's bath component concentrations, as well as operating pH and temperature are exemplary ranges of operating conditions and it is equally envisaged that these concentrations and conditions may be varied depending on the electrodeposition application and still provide acceptable electrodeposition as well as acceptable corrosion resistant coating composition.

It is equally envisaged that the electrolyte solution may comprise further additives such as brighteners. Exemplary brighteners include, but are not limited to, carrier brighteners containing sulfur and providing uniform fine grain structure to the nickel plating (e.g. paratoluene sulfonamide or benzene sulfonic acid at 0.75-25 g/L), levelers or second class brighteners (e.g. allyl sulfonic acid or formaldehyde chloral hydrate at 0.0045-0.15 g/L), auxiliary brighteners (e.g. sodium allyl sulfonate or pyridinum propyl sulfonate at 0.075-4 g/L) and inorganic brighteners (e.g. cobalt, zinc at 0.075-4 g/L). The type of added brightener and its concentration determine the deposit appearance and luster including, but not limited to, brilliant, bright, semi-bright, satin and mixtures thereof.

In addition to a Watt's bath, it is equally envisaged that other types of electrolyte solutions, electrochemical cells, or electrodepositing baths may be used in the present method. Exemplary other types of electrolyte solutions include, but are not limited to, nickel sulfamate baths (nickel sulfamate, $Ni(SO_3NH_2)_2$ at 300-450 g/L, nickel chloride $NiCl_2.6H_2O$ at 0-30 g/L, boric acid $H_3BO_3$ at 30-45 g/L), all-chloride baths (nickel chloride, boric acid), sulfate-chloride baths, all-sulfate baths (nickel sulfate, boric acid), hard nickel baths (nickel sulfate at 160-200 g/L, ammonium chloride at 20-30 g/L, boric acid at 20-40 g/L), black nickel baths (nickel ammonium sulfate $NiSO_4.(NH_4)_2SO_4.6H_2O$, zinc sulfate $ZnSO_4$ and sodium thiocyanate NaCNS) and the like.

In one embodiment, the method of forming the coating resistant composition comprises direct current electrodeposition or a continuous direct current at a current density of 20-100 mA/cm$^2$, preferably 30-80 mA/cm$^2$, more preferably 40-60 mA/cm$^2$, or about 50 mA/cm$^2$. The current density used during the electrodepositing may be variable depending on the application and may range from 0.01-300 mA/cm$^2$. For depositing relatively smaller particles preferentially onto the substrate, a current density of 0.01-1.0 mA/cm$^2$, preferably 0.01-0.75 mA/cm$^2$, more preferably 0.01-0.50 mA/cm$^2$ may be used. For depositing larger particles preferentially onto the substrate, a current density of 1-300 mA/cm$^2$, preferably 10-250 mA/cm$^2$, more preferably 20-200 mA/cm$^2$ may be used. As used herein, the term "preferentially" refers to the deposition of a particular particle size (e.g. small) more frequently or in higher amounts relative to a different sized particle (e.g. large), even though both particle sizes are likely to be deposited onto a substrate to a certain extent.

In a preferred embodiment, the method of forming the coating resistant composition comprises pulse electrodeposition or pulsing current into the electrochemical cell or electrolyte solution. In a preferred embodiment, the pulse electrodeposition is performed such that the pulsing current has a maximum amplitude of less than 10 A, preferably less than 8 A, more preferably less than 6 A or 5 A. In a preferred embodiment, the pulsing comprises a repeating sequence of current amplitude with a pulse on-time (or current on-time, $T_{on}$) of 1-ms, preferably 1-4 ms, preferably 1-3 ms, more preferably 1-2.5 ms, or 2 ms and a pulse off-time (or current off-time, $T_{off}$) of 5-15 ms, preferably 6-14 ms, preferably 8-12 ms, more preferably 8-11 ms, more preferably 9-11 ms, or 10 ms. In a preferred embodiment, the duration of the pulse or current on-times is the same and the duration of the pulse or current off-times is the same during the repeating sequence. In a preferred embodiment, the maximum current amplitude during pulse on-times is the same for each pulse on-time during the repeating sequence (e.g. a maximum amplitude of 5 A is repeated during each pulse on-time). After and during the pulsing, the method of the present disclosure involves electrodepositing nickel onto the substrate and forming a deposited layer of nickel nanoparticles. Thus, the pulsing electrodeposits nickel nanoparticles onto the substrate (i.e. the inhibitor coated metal substrate) to deposit and form the second coating layer comprising nickel (Ni) nanoparticles of the corrosion resistant coating composition for a metal substrate of the present disclosure.

In one embodiment, the method may further comprise adding a gas to the electrochemical cell or electrolyte solution or Watt's bath to promote circulation in the solution during the pulsing and/or the electrodepositing. The gas may include, but is not limited to, oxygen, air, or an inert gas (nitrogen, argon, etc.). In another embodiment, the method may further comprise agitating the electrolyte solution or Watt's electrochemical cell to provide a more uniform solution and thus a more uniform coating, wherein the coating is a substantially uniform mixture of the various components described herein. The agitating may include, but is not limited to stirring, sonicating, shaking, swirling and the like. In another embodiment, the method may further comprise rotating the substrate about a first axis during the electrodepositing. The rotating may also involve rotating the substrate around a second axis that is non-parallel to the first during the electrodepositing. Rotating the substrate may provide a coating to the entire substrate. In one embodiment the substrate is evenly coated, where the average coating thickness differs by no more than 5%, by no more than 4%, by no more than 3%, preferably by no more than 2%, preferably by no more than 1% at any given location on the surface of the substrate. Without rotating the substrate, it may be possible to coat the substrate in an even fashion or in an uneven fashion, wherein the average thickness differs by more than 5% at any given location on the surface of the substrate. In one embodiment, the substrate may comprise a complex shape with at least one hidden or not easily accessible surface that is coated with the deposited layer.

In one embodiment, the method may further comprise a variety of post processing procedures to aid temperature protection, creep prevention, corrosion resistance, etc. including, but not limited to, aluminizing, pack cementation, gas phase coating, chemical vapor deposition (CVD), thermal spraying, physical vapor deposition and the like. Additional exemplary post processing procedures may include, but are not limited to, calcining, scrubbing, acid pickling, alkaline washing, heat treating, cleaning, masking, etching, blasting treatment, grinding, UV treatment, and the like. These post processing procedures may be performed on the inhibitor coated metal substrate after applying a coating of phosphate corrosion inhibitor and before electrodepositing a layer of nickel nanoparticles, after formation of the formation of the corrosion resistant coating composition for a metal substrate, or both. These techniques may be used to more adequately solidify or affix the first coating layer, the second coating layer, or both and may also comprise further treatments with other anti-corrosion materials. In addition, techniques to test the temperature stability, creep properties, instrumented nanohardness, or corrosion properties may be used to test the corrosion resistant composition of the present disclosure after formation. Such techniques are known to those of ordinary skill in the art.

According to a fourth aspect, the present disclosure relates to a method for inhibiting corrosion of a metal substrate comprising i) coating the metal substrate with a phosphate corrosion inhibitor to form an inhibitor coated metal substrate and ii) electrodepositing a layer of nickel nanoparticles over the inhibitor coated metal substrate in an electrolyte solution to form a corrosion resistant metal substrate. In a preferred embodiment, the phosphate corrosion inhibitor is sodium phosphate monobasic ($NaH_2PO_4$) and the nickel nanoparticles comprise fine equiaxed grains existing in the form of colonies with an average grain size of less than 100 nm. In a preferred embodiment, the metal substrate comprises carbon steel. In a preferred embodiment, the method reduces the corrosion rate of the metal substrate in mils penetration per year (mpy) by 10-80% relative to the corrosion rate of a substantially similar metal substrate lacking the inhibitor, the layer of nickel nanoparticles or both, preferably 15-75%, preferably 20-70%, preferably 30-65%, preferably 40-60% relative to the corrosion rate of a substantially similar metal substrate lacking the inhibitor, the layer of nickel nanoparticles or both.

The examples below are intended to further illustrate methods and protocols for preparing and characterizing the corrosion resistant coatings for metal substrates of the present disclosure. Further, they are intended to illustrate assessing the properties of these coating compositions. They are not intended to limit the scope of the claims.

EXAMPLE 1

Electrodeposition

Plain carbon steel discs with 16 mm diameter were metallographically ground and polished to a 1 μm surface finish. They were degreased with acetone and rinsed with distilled water. The composition of Watt's bath used for this study was $NiSO_4.6H_2O$ (250 g), $NiCl_2.6H_2O$ (50 g), and $H_3BO_3$ (35 g) per liter of distilled water. Pure Ni sheet was used as anode and carbon steel as cathode during electrodeposition. The pH and temperature of the electrolyte was kept at 3.6 and 45° C. respectively. A current density of 50 mA/cm$^2$ was used for direct current (dc) plating. Pulse electrodeposition was performed at different peak currents of 5 A for durations of 20 minutes. Pulse on-time ($T_{on}$) and off-time ($T_{off}$) were set at 2 and 10 msec respectively.

In some cases, inhibitor is applied to the surface of the steel substrate prior to inserting it into the bath for electrodeposition. It has been observed that the presence of an inhibitor film at the cathode surface does not adversely affect the deposition process. The same deposition parameters were used for treated and untreated samples and uniform, continuous and adherent deposition was obtained in each case. The inhibitor used in this study was $NaH_2PO_4.H_2O$ whose role becomes important as corrosion processes progress. Its incorporation is believed to retard anodic dissolution and enhance corrosion protection of underlying substrate by acting as a barrier layer between the coating and the substrate. Carbon steel substrates were immersed in $NaH_2PO_4.H_2O$ (sodium dihydrogen phosphate monohydrate) inhibitor for a period of 24 hours prior to Ni electrodeposition.

EXAMPLE 2

Materials Characterization

An atomic force microscope (AFM-contact mode) and a field emission scanning electron microscope (FE-SEM) equipped with a scanning transmission electron microscope (STEM) detector were used to examine the surface morphology and microstructure of electrodeposited Ni. The interface between the substrate and the Ni coating was imaged after preparing a thin cross-sectional sample using a focused ion beam (FIB) instrument. An X-ray diffractometer equipped with a monochromator was used to determine the phase constitution, grain size and texture of Ni coatings. The diffraction spectra were generated using CuKα radiation (X=1.54184 A°) source operating at 40 KV and 40 mA. Phase identification was carried out using a Bragg-Brentano (BB) configuration with 0/20 scan axis.

Figure 2:
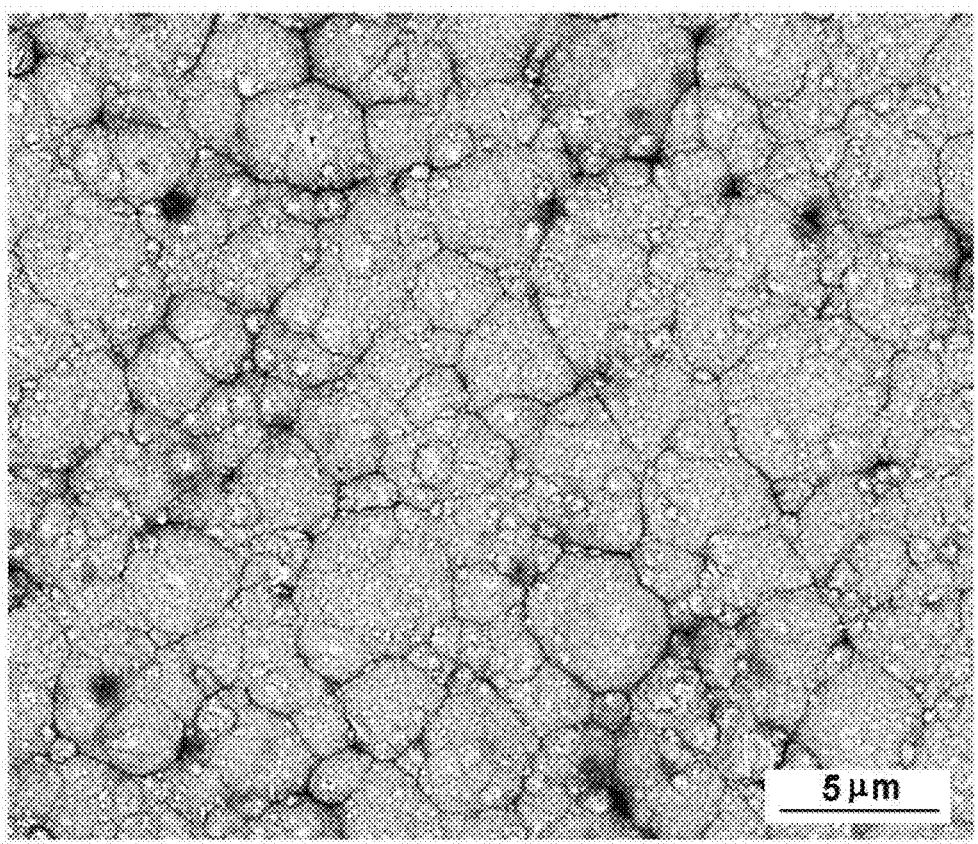
FIG. 2 is a SEM micrograph image showing the surface morphology of Ni produced by pulse electrodeposition.
Figure 3:
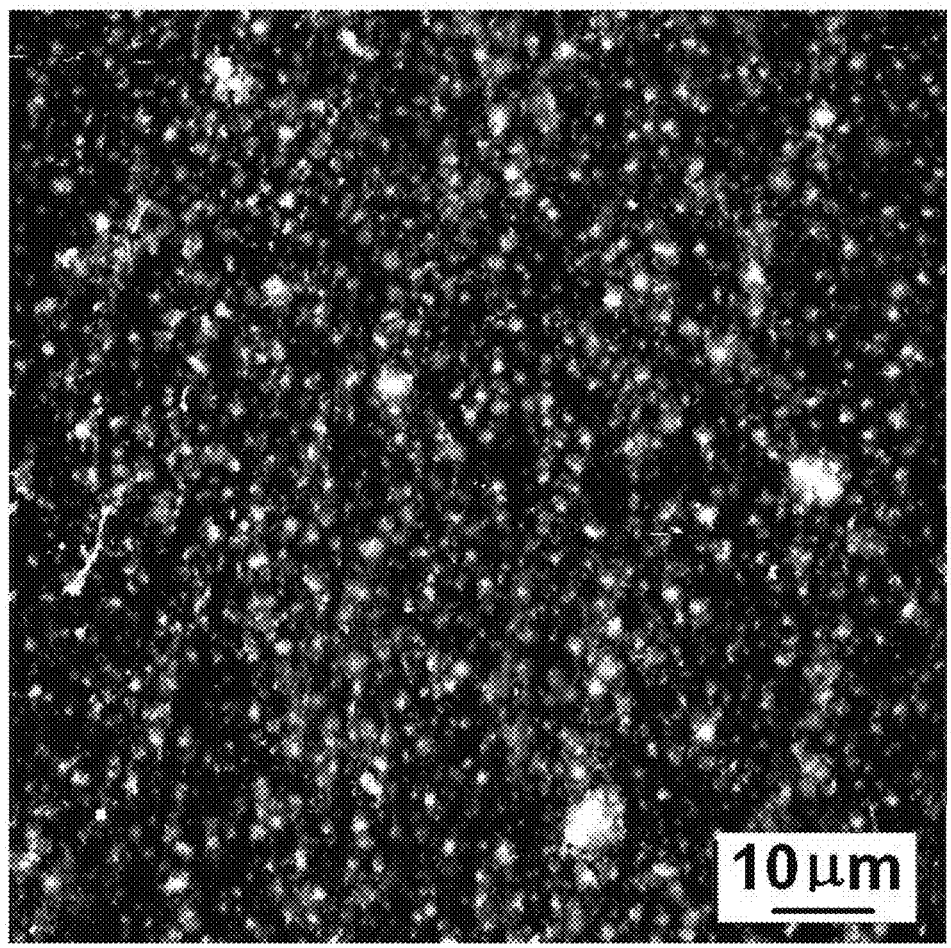
FIG. 3 is an atomic force microscopy (AFM) micrograph image showing the fine surface morphology of Ni produced by pulse electrodeposition.
Figure 4:
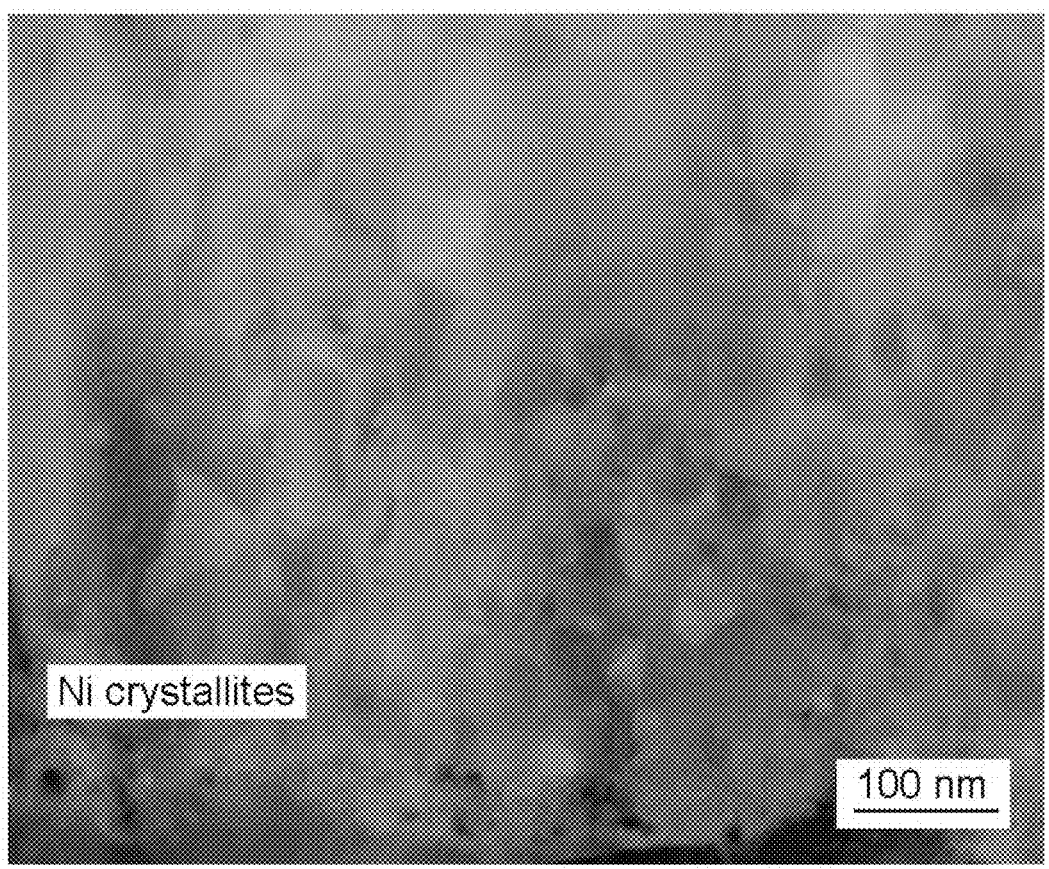
FIG. 4 is a cross-sectional high angle annular dark field (HAADF) image mapped by a scanning transmission electron microscope (STEM) showing Ni produced by pulse electrodeposition.

Surface morphology of Ni obtained using dc electrodeposition revealed coarse compact pyramidal-shaped grains as show in the SEM micrograph of FIG. 1. The maximum grain size observed was approximately 3 μm. Pulse electrodeposition produced fine equiaxed grains existing in the form of colonies that are separated by crevices as shown in FIG. 2. Fine surface morphology of pulse electrodeposited Ni was also revealed in the AFM image of FIG. 3. A bright field STEM cross-sectional image of the interface between the substrate and Ni coating for a pulse electrodeposit sample is shown in FIG. 4. It is clear that the grain size of Ni coating is small, especially in the initial stages of the deposition where it can be as fine as ~10 μm. The difference in grain morphology obtained by dc and pulse electrodeposition was also shown by a difference in their instrumented nanoindentation hardness.

Instrumented nanohardness measurements were undertaken using a Berkovich (three-sided pyramid) diamond nanoindenter which penetrated the sample at a load of 100 mN and load/unload speed of 200 mN/min. The indenter remained stationary for 30 seconds between each loading and unloading cycle. The nanohardness data was generated from the normal force versus penetration depth curves. A set of four indentations was acquired for each test. Nanoindentation hardness ($H_s$) is measured as the resistance to permanent deformation or damage and is calculated as follow by the equation of formula (I).

$$H_s = \frac{F_{max}}{A_p} (Pascal) \quad (I)$$

In this formula $F_{max}$ is the maximum force and $A_p$ is the projected contact area. The instrumented nanohardness of Ni coatings obtained by the dc method was 2492 MPa (230 VHN) compared to 3384 MPa (313 VI-IN) for pulsed Ni coatings. Refinement in grain size is thought to be responsible for an increase in the hardness of pulsed coatings.

Figure 5:
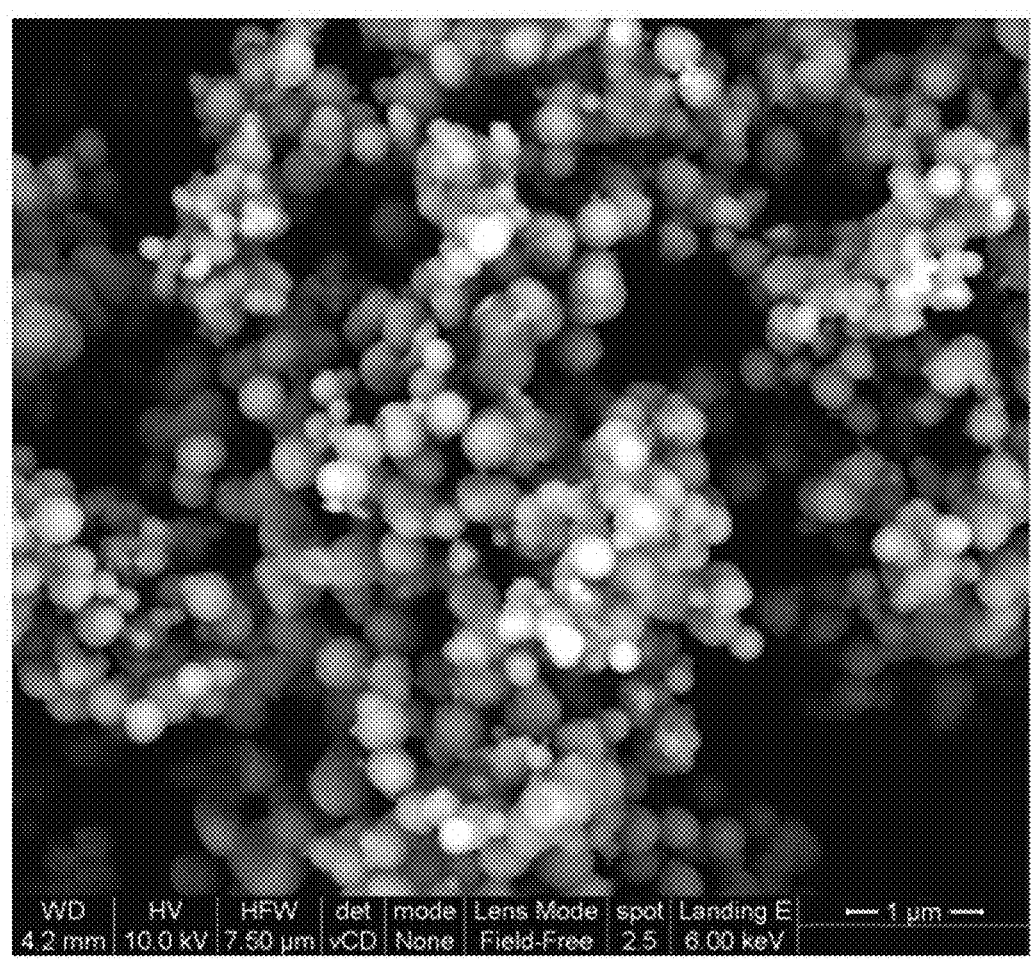
FIG. 5 is a SEM micrograph image of a carbon steel sample dipped in $NaH_2PO_4$—$H_2O$ inhibitor.
Figure 6:
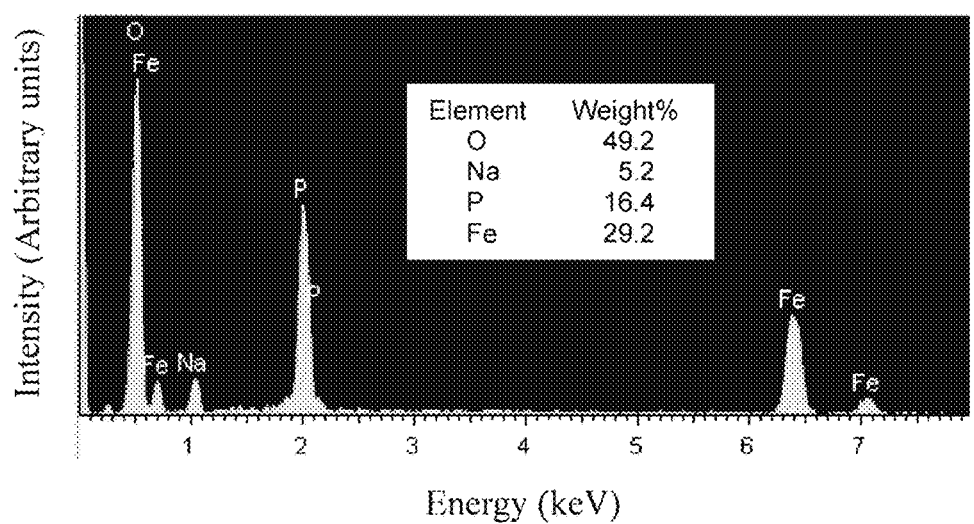
FIG. 6 is an energy dispersive X-ray spectroscopy (EDX) spectrum and microchemical analysis of a carbon steel sample dipped in $NaH_2PO_4.H_2O$ inhibitor.
Figure 7:
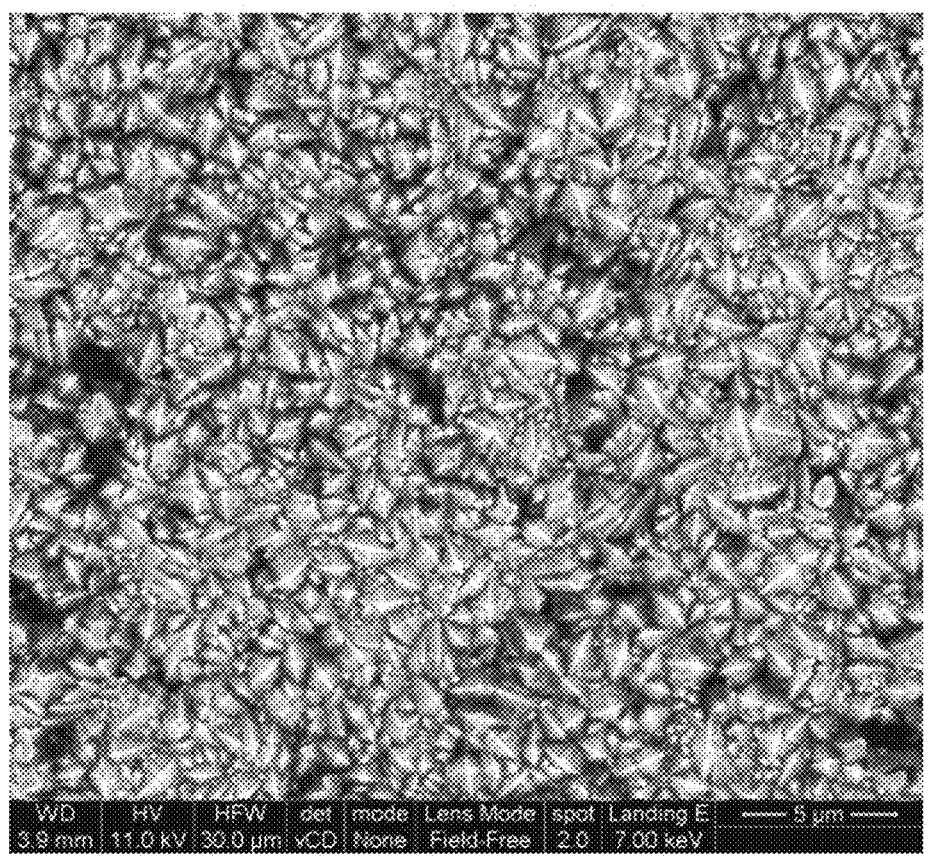
FIG. 7 is a SEM micrograph image showing the surface morphology of de plated Ni covering an inhibited carbon steel sample.
Figure 8:
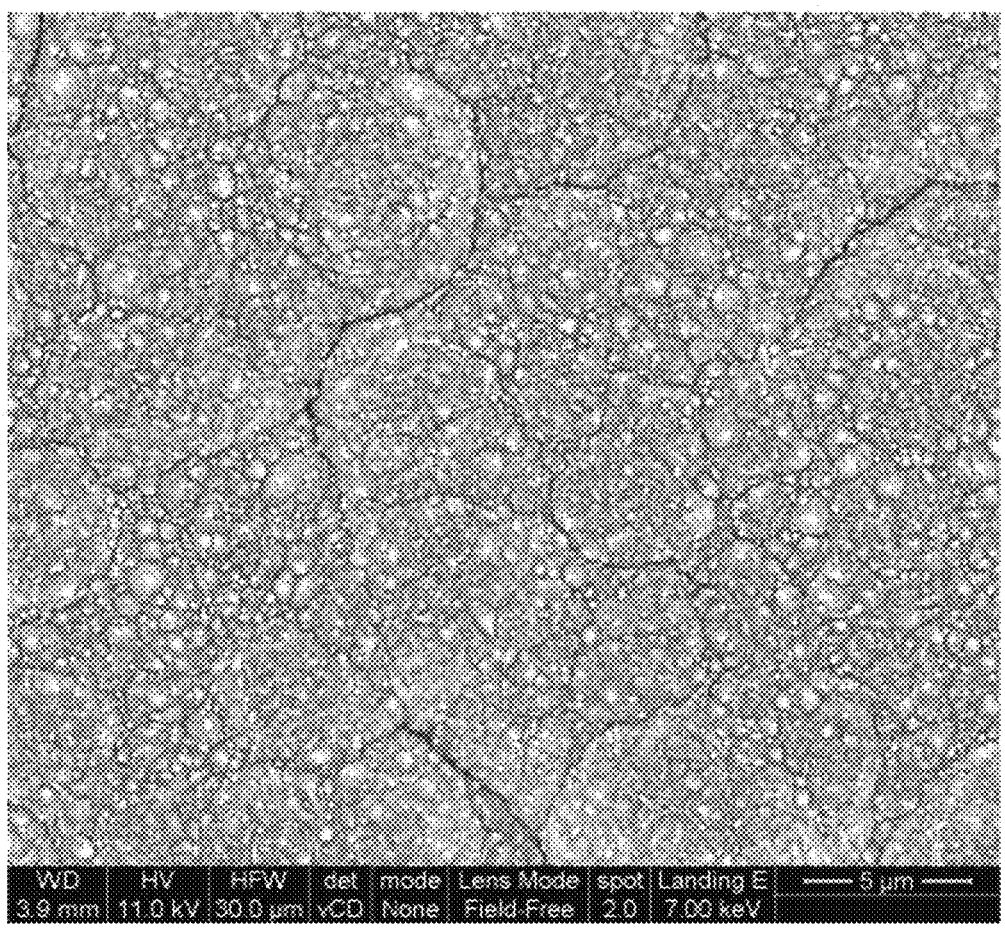
FIG. 8 is a SEM micrograph image showing the surface morphology of pulse plated Ni covering an inhibited carbon steel sample.

Carbon steel samples were dipped in $NaH_2PO_4.H_2O$ inhibitor for 24 hours and the top surface was examined using SEM. Inhibitor was uniformly distributed over the surface and exhibited a spherical morphology as shown in FIG. 5. Microchemical analysis of the top surface using SEM/EDS (FIG. 6) showed the presence of Na, P and O from the inhibitor and Fe from the underlying carbon steel substrate. The inhibited carbon steel substrate surfaces were deposited with Ni using dc and pulse plating techniques. Surface morphology of dc and pulse plated Ni covering inhibited carbon steel samples is shown in the SEM images of FIG. 7 and FIG. 8 respectively. Application of a uniform Ni coating was possible and the presence of inhibitor on the steel surface did not seem to adversely affect the electrodeposition process.

Figure 9:
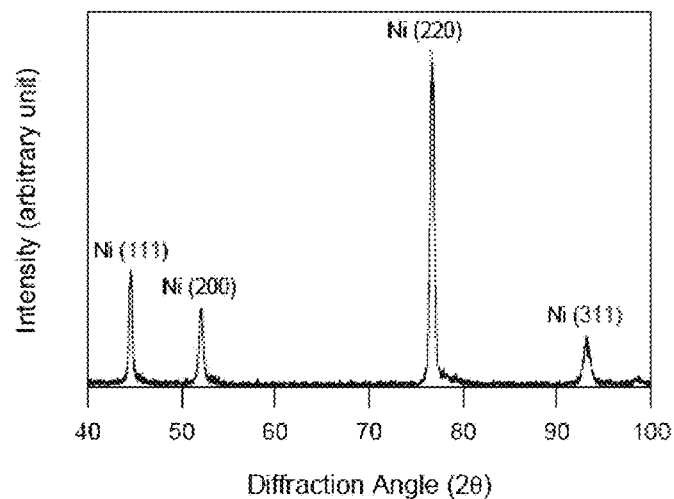
FIG. 9 is an X-ray diffraction (XRD) spectrum of pulse electrodeposited Ni covering an inhibited carbon steel sample.

The X-ray diffraction spectrum obtained from the top surface of the pulse Ni electrodeposited samples is shown in FIG. 9. The peak with the highest intensity corresponds to Ni (220) indicating preferred orientation. Preferred growth orientation of planes has been reported in the literature for pulse deposited Ni.

EXAMPLE 3

Corrosion Measurements

Corrosion tests were carried out in neutral 3.5% NaCl solution at 23° C. Potentiodynamic polarization curves were acquired for a ±250 mV potential range and at a slow scan rate of 0.166 mV s$^{-1}$. A three-electrode cell was used for corrosion measurements. Saturated calomel electrode was used as reference and the carbon steel samples were employed as working electrodes. The tests were controlled through a standard potentiostat connected to a computer.

Typical potentiodynamic polarization plots obtained for dc and pulse electrodeposited Ni with and without inhibitor treatment are shown in FIG. 10 and the various electrochemical measurements are listed in Table 1. Zero current potential (ZCP) for untreated fine grained Ni was noble compared to that of untreated coarse grained Ni. High grain boundary density in fine grained Ni influences the hydrogen evolution reaction shifting the potential to more noble values. The corrosion rate of fine grained Ni was lower than the coarse grained counterpart. This is attributed to the more compact microstructure of the fine grained Ni electrodeposit that results in an increase in the resistance to anodic dissolution.

TABLE 1

Electrochemical measurements obtained from potentiodynamic polarization plots for untreated and inhibitor treated Ni electrodeposits

| | Untreated Ni (without inhibitor) | | Treated Ni (with inhibitor) | |
|---|---|---|---|---|
| | Pulse (grain size <100 nm) | DC (grain size ~3 μm) | Pulse (grain size <100 nm) | DC (grain size ~3 μm) |
| ZCP (mV) | −466.2 | −523.5 | −406.5 | −569.1 |
| Corrosion rate (mpy) | 1.114 | 4.301 | 0.7026 | 4.554 |

The electrochemical behavior of inhibitor treated electrodeposits followed a pattern similar to that of untreated electrodeposits. Fine grained Ni exhibited a nobler ZCP and a lower corrosion rate compared to coarse grained Ni. A comparison between the plots reveals that electrodeposited Ni treated with inhibitor shows better corrosion properties than untreated Ni. Resistance to corrosion for coarse grained treated coatings is comparable between treated and untreated coatings. Corrosion behavior for all four types of electrodeposits can be rated from top to bottom as: treated fine grained Ni, untreated fine grained Ni, untreated coarse grained Ni, and treated coarse grained Ni. The influence of grain size on the corrosion behavior was prominent in this study since the layer of inhibitor existed underneath the Ni coating.

Figure 11:
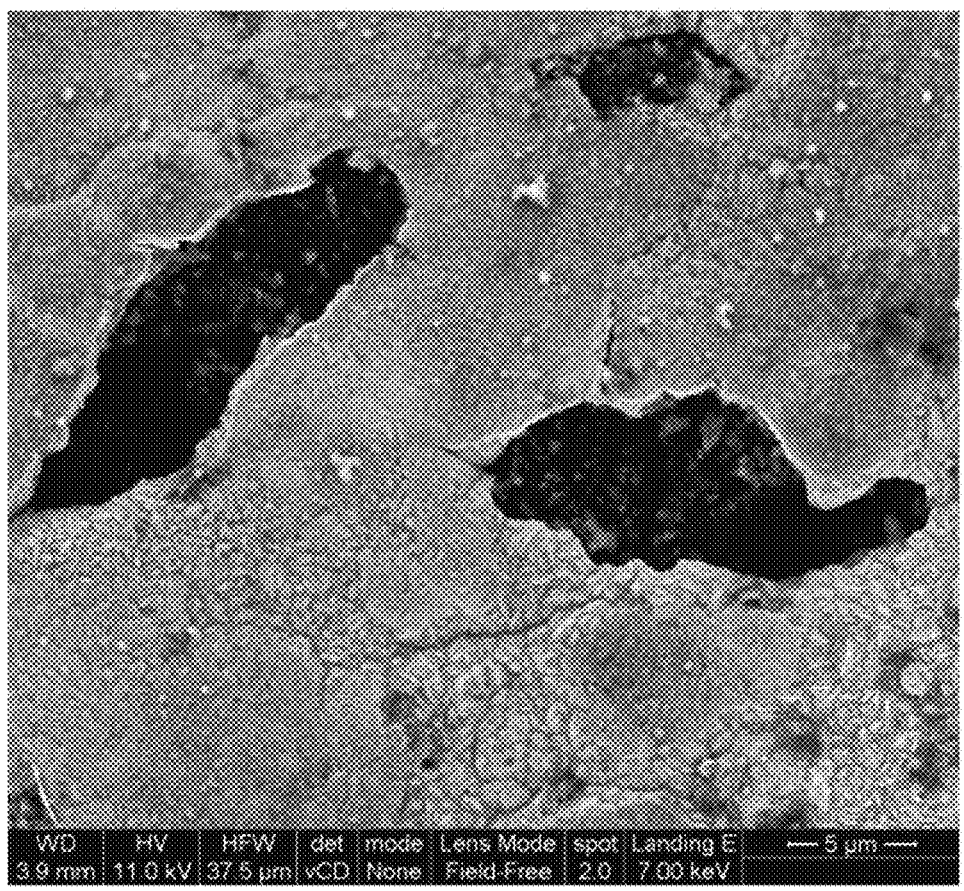
FIG. 11 is a SEM micrograph image showing the surface morphology of electrodeposited Ni after polarization for coarse Ni deposited on untreated carbon steel.
Figure 12:
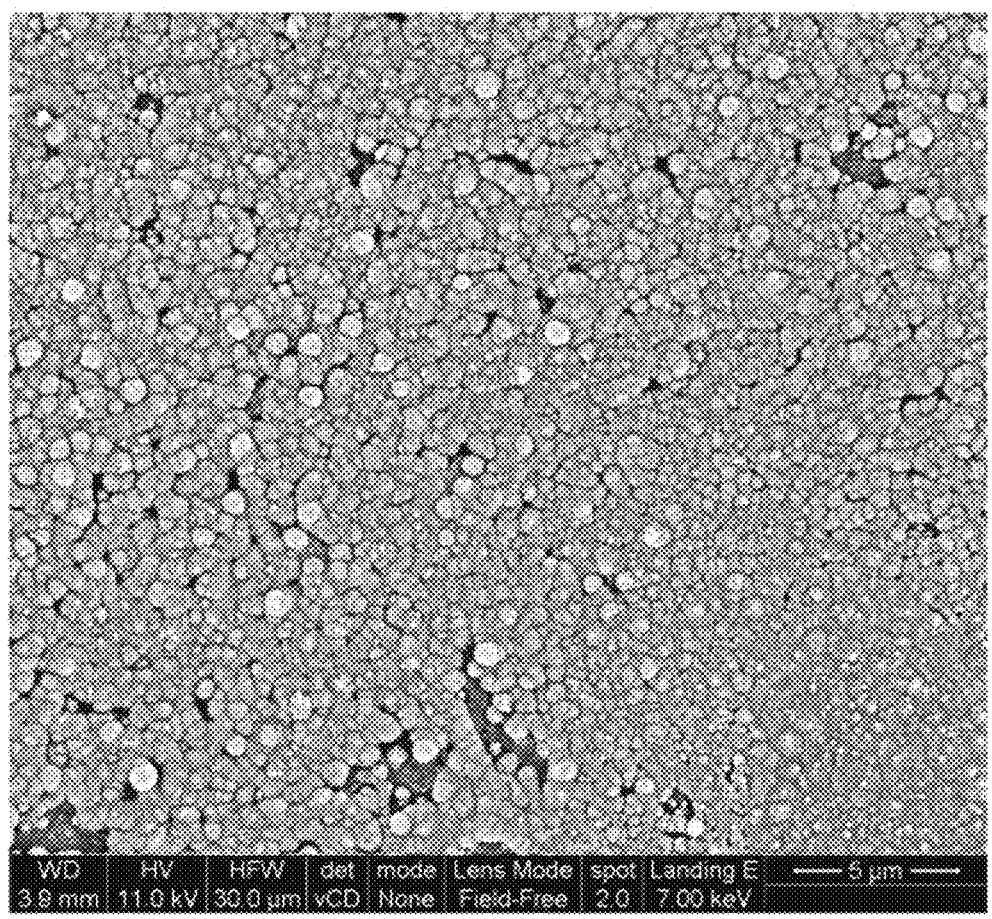
FIG. 12 is a SEM micrograph image showing the surface morphology of electrodeposited Ni after polarization for fine Ni deposited on untreated carbon steel.
Figure 13:
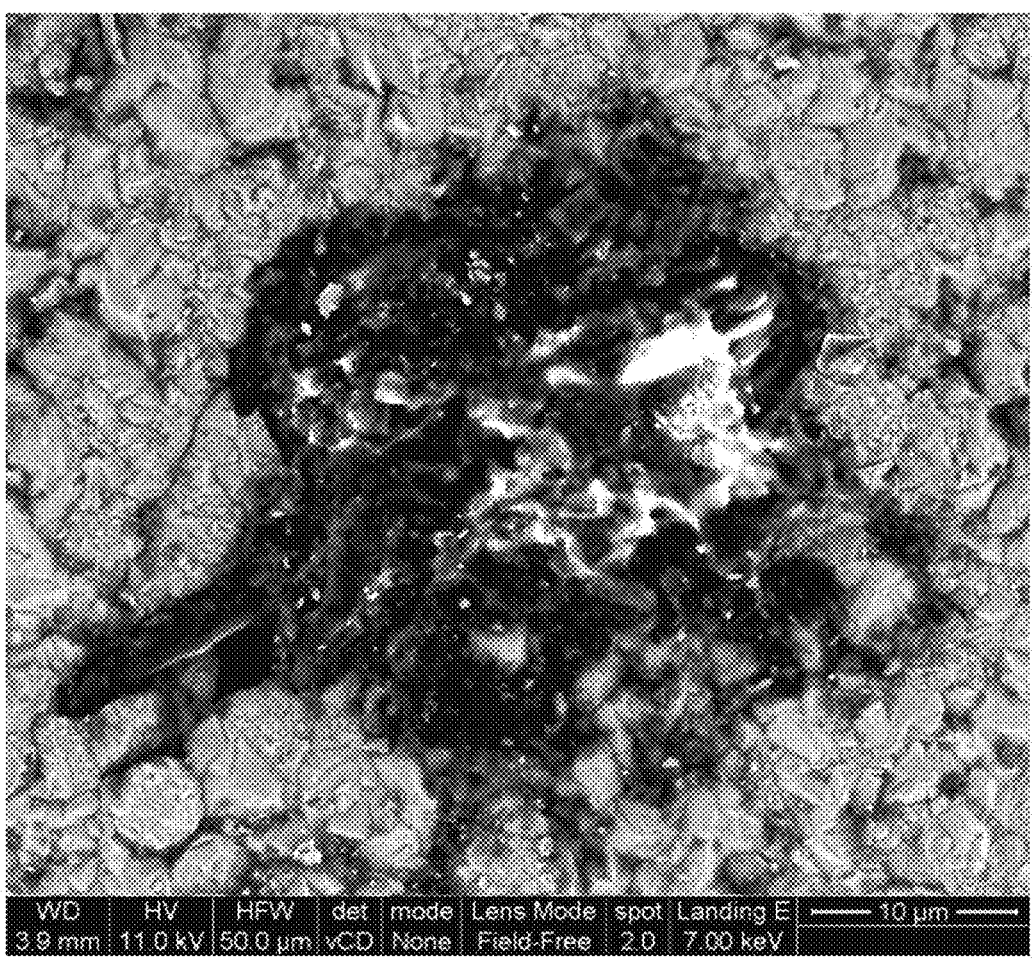
FIG. 13 is a SEM micrograph image showing the surface morphology of electrodeposited Ni after polarization for coarse Ni deposited on inhibitor treated carbon steel.
Figure 14:
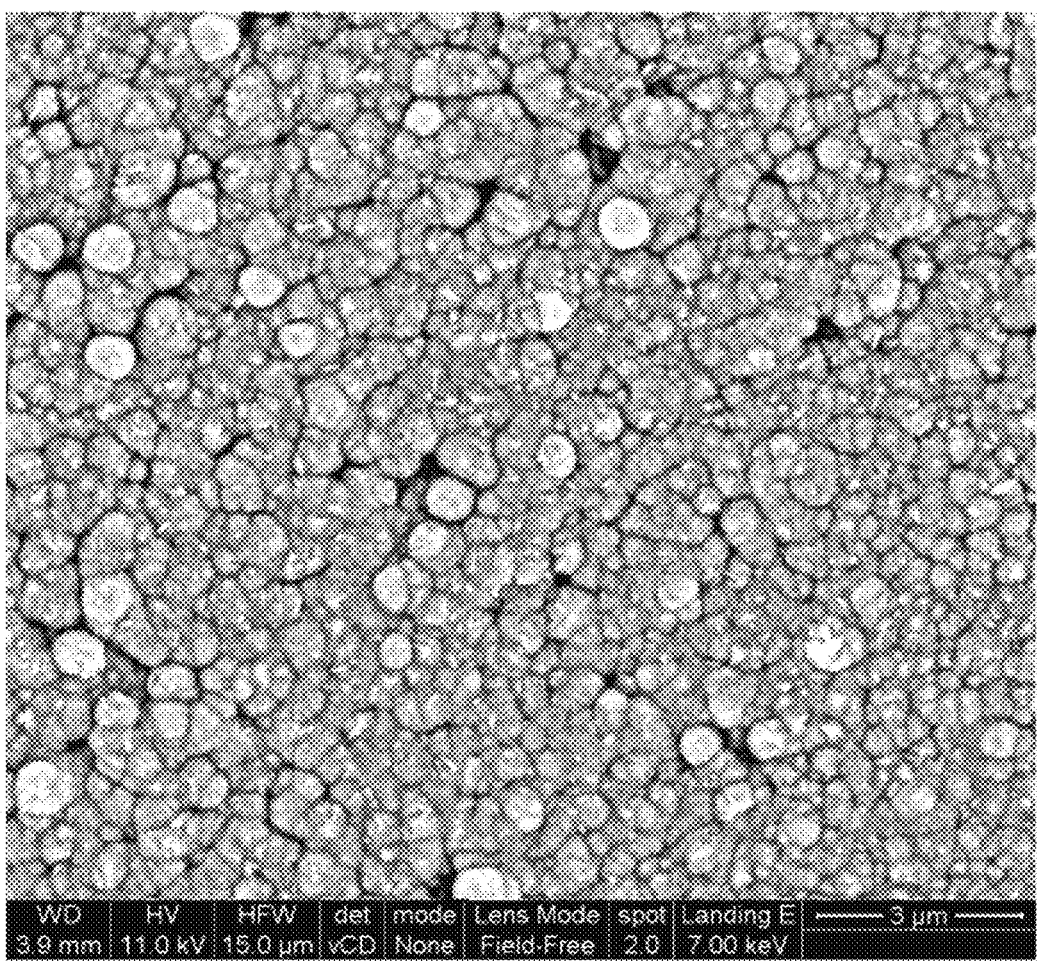
FIG. 14 is a SEM micrograph image showing the surface morphology of electrodeposited Ni after polarization for fine Ni deposited on inhibitor treated carbon steel.

Surface morphology of untreated coarse and fine Ni after polarization is shown in FIG. 11 and FIG. 12 respectively. Density and depth of pits in the coarse grained Ni electrodeposit is higher. The pits are shallower and lower in density in the fine grained Ni. Surface morphologies of coarse and fine electrodeposits treated with an inhibitor are shown in FIG. 13 and FIG. 14 respectively. The pit density is significantly lower in fine grained Ni. Surface damage of both treated samples is lower compared to that of untreated samples.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A coated metal substrate, comprising:
   a metal substrate;
   a first coating layer consisting of sodium phosphate monobasic ($NaH_2PO_4$; and
   a second coating layer comprising nickel (Ni) nanoparticles;
   wherein the first coating layer is disposed between the metal substrate and the second coating layer; and
   wherein the nickel nanoparticles are in the form of fine equiaxed grains with an average grain size of less than 100 nm existing in the form of colonies that are separated by crevices.

2. The coated metal substrate of claim 1, wherein the metal substrate comprises carbon steel.

3. The coated metal substrate of claim 1, wherein the second coating layer has an average thickness in the range of 1-150 μm.

4. The coated metal substrate of claim 1, wherein the first coating layer covers greater than 75% of the surface of the metal substrate and the second coating layer covers greater than 75% of the surface of the first coating layer.

5. The coated metal substrate of claim 1, wherein the second coating layer comprising Ni nanoparticles has an instrumented nanohardness in the range of 2500-3900 MPa.

6. The coated metal substrate of claim 1, which has a corrosion rate of 0.2-4.0 mils penetration per year (mpy).

7. The coated metal substrate of claim 1, which has a zero current potential (ZCP) of −350 mV to −550 mV.

8. The coated metal substrate of claim 1, wherein the second coating layer comprising Ni nanoparticles has an instrumented nanohardness in the range of 3300-3500 MPa.

9. The coated metal substrate of claim 1, wherein the second coating layer comprises greater than 80% by weight of the nickel (Ni) nanoparticles relative to the total weight of the second coating layer.

10. A method of forming the coated metal substrate of claim 1, comprising:
    applying the first coating layer consisting of the sodium phosphate monobasic ($NaH_2PO_4$) to the metal substrate to form an inhibitor coated metal substrate; and
    electrodepositing the second coating layer comprising nickel nanoparticles onto the inhibitor coated metal substrate in an electrolyte solution to form the coated metal substrate.

11. The method of claim 10, wherein the electrolyte solution is a Watt's bath, comprising:
    an aqueous solution comprising 2-5 wt % NaCl relative to the total weight of the aqueous solution;
    nickel sulfate;
    nickel chloride; and
    boric acid ($H_3BO_3$).

12. The method of claim 10, wherein the electrolyte solution has a pH in the range of 3-5 and the electrodepositing is performed with the electrolyte solution having a temperature in the range of 35-65° C.

13. The method of claim 10, wherein the electrodepositing is performed by pulse electrodeposition.

14. The method of claim 13, wherein the pulse electrodeposition is performed at a maximum current amplitude of less than 10 A.

15. The method of claim 13, wherein the pulse electrodeposition comprises a repeating sequence of current amplitude with a pulse on-time of 1-5 msec and a pulse off-time of 5-15 msec.

16. The method of claim 15, wherein a duration of each pulse on-time is the same, the duration of each pulse off-time is the same, and a maximum current amplitude during each pulse on-time is the same in the repeating sequence.

17. The method of claim 10, wherein the applying and the electrodepositing reduces the corrosion rate of the metal substrate in mils penetration per year (mpy) by 10-80% relative to the corrosion rate of a substantially similar metal substrate lacking the first coating layer, the second coating layer, or both.

* * * * *